United States Patent
Yazdani et al.

(10) Patent No.: US 6,859,455 B1
(45) Date of Patent: Feb. 22, 2005

(54) METHOD AND APPARATUS FOR BUILDING AND USING MULTI-DIMENSIONAL INDEX TREES FOR MULTI-DIMENSIONAL DATA OBJECTS

(76) Inventors: Nasser Yazdani, 579 F., Sarah La., Creve Coeur, MO (US) 63146; Paul Seungkyu Min, 53 Arundel Pl., Clayton, MO (US) 63105

(*) Notice: Subject to any disclaimer, the term of this patent is extended or adjusted under 35 U.S.C. 154(b) by 853 days.

(21) Appl. No.: 09/710,193

(22) Filed: Nov. 10, 2000

Related U.S. Application Data

(63) Continuation-in-part of application No. 09/474,452, filed on Dec. 29, 1999, now Pat. No. 6,614,789.

(51) Int. Cl.[7] .............................. H04L 12/28
(52) U.S. Cl. ...................... 370/392; 370/401
(58) Field of Search ................. 370/389, 401, 370/392, 402; 707/6, 7, 103 R, 103 Y, 103 Z

(56) References Cited

U.S. PATENT DOCUMENTS

| | | | |
|---|---|---|---|
| 4,464,650 A | | 8/1984 | Eastman et al. |
| 5,758,024 A | | 5/1998 | Alleva |
| 5,761,652 A | * | 6/1998 | Wu et al. ............ 707/2 |
| 5,781,772 A | | 7/1998 | Wilkinson, III et al. |
| 5,806,065 A | * | 9/1998 | Lomet ............... 707/8 |
| 5,812,853 A | | 9/1998 | Carroll et al. |
| 6,614,789 B1 | * | 9/2003 | Yazdani et al. ....... 370/392 |

OTHER PUBLICATIONS

A. Brodnik, S. Carlsson, M. Degermark, and S. Pink, *Small Forwarding Tables for Fast Routing Lookups*, Proceeding of ACM SIGCOMM Conference 1997, pp. 3–14, Sep. 14–18, 1997, Cannes, France.

G. Karlsson and S. Nilsson, *Fast address lookup for Internet routers*, Proceedings of IEEE Broadband Communications 98, Apr. 1998 (12 pages).

V. Srinivasan and G. Varghese, *Fast Address Lookups using Controlled Prefix Expansion*, Proceedings of ACM Sigmetrics, Sep. 1998 (37 pages).

B. Plattner, J. Turner, G. Varghese, and M. Waldvogel, *Scalable High Speed IP Routing Lookups*, Proceedings of ACM SIGCOMM Conference 1997, pp. 25–36, Sep. 14–18, 1997, Cannes, France.

T.V. Lakshman and D. Stiliadis, *High–Speed Policy–based Packet Forwarding Using Efficient Multi–dimensional Range Matching*, Proceedings of ACM SIGCOMM Conference 1998, pp. 203–214, Aug. 31–Sep. 4, 1998, Vancouver, B.C., Canada.

(List continued on next page.)

*Primary Examiner*—Chi Pham
*Assistant Examiner*—Keith M. George
(74) *Attorney, Agent, or Firm*—Thompson Coburn, LLP

(57) ABSTRACT

A method and apparatus are provided for building a searchable multi-dimensional index tree that indexes a plurality of data objects. In one aspect of the invention, the index tree divides dataspace into three subspaces and indexes the data objects using a single dimension. If too many data objects map to the same point in that dimension, the dimension is switched to a new dimension of the data object and the data object is indexed using the new dimension. A split node having a split value is used to keep track of the indexing. In another aspect of the invention, the index tree divides dataspace into two subspaces, and equal bits are used in the split nodes to track the content of the data objects in the subspaces. If too many data objects sharing the same key within the same dimension map to a single point, then the dimension is switched to a new dimension and the data objects are indexed using the new dimension. Also disclosed is the multi-dimensional index tree itself as well as a router that uses the multi-dimensional index tree of the present invention to provide packet classification functions.

82 Claims, 14 Drawing Sheets

OTHER PUBLICATIONS

D. Decasper, Z. Dittia, G. Parulkar, and B. Plattner, *Router Plugins: A Modular and Extensible Software Framework for Modern High Performance Integrated Services Routers*, Washington University Technical Report WUCS–98–08, 27 pages, Feb. 1998, St. Louis, MO.

P. Gupta, S. Lin, and N. McKeown, *Routing Lookups in Hardware at Memory Access Speeds*, IEEE Infocom vol. 3, pp. 1240–1247, Apr. 1998, San Francisco, CA.

B. Lampson, V. Srinivasan and G. Varghese, *IP Lookups using Multiway and Multicolumn Search*, IEEE Infocom '98, 25 pages, Apr. 1998, San Francisco, CA.

K. Sklower, *A Tree–Based Routing Table for Berkeley Unix*, Proceedings of the USENIX Winter 1991 Technical Conference, pp. 93–104, Jan. 1991, Dallas, TX.

J. Turner, *Design and Analysis of Switching Systems*, Washington University, St. Louis, MO, Jan. 1999.

* cited by examiner

| Prefix | Next Hop |
|---|---|
| 10* | 7 |
| 01* | 5 |
| 110* | 3 |
| 1011* | 5 |
| 0001* | 0 |
| 01011* | 7 |
| 00010* | 1 |
| 001100* | 2 |
| 1011001* | 3 |
| 1011010* | 5 |
| 0100110* | 6 |
| 01001100* | 4 |
| 10110011* | 8 |
| 10110001* | 10 |
| 01011001* | 9 |

| Prefix | Abbreviation | Prefix | Abbreviation |
|---|---|---|---|
| 10 | - | 1101110010 | K |
| 01 | - | 10001101 | L |
| 110 | - | 11101101 | M |
| 1011 | - | 01010110 | N |
| 0001 | - | 00100101 | O |
| 01011 | - | 100110100 | P |
| 00010 | - | 101011011 | Q |
| 001100 | A | 11101110 | R |
| 1011001 | B | 10110111 | S |
| 1011010 | C | 011010 | T |
| 0100110 | D | 011011 | U |
| 01001100 | E | 011101 | V |
| 10110011 | F | 0110010 | W |
| 10110001 | G | 101101000 | X |
| 01011001 | H | 101101110 | Y |
| 001011 | I | 00011101 | Z |
| 00111010 | J | 011110110 | Π |

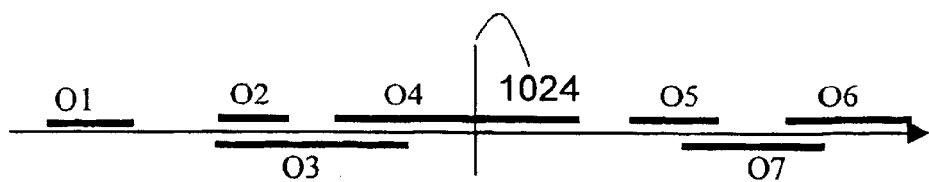
Figure 11(a)
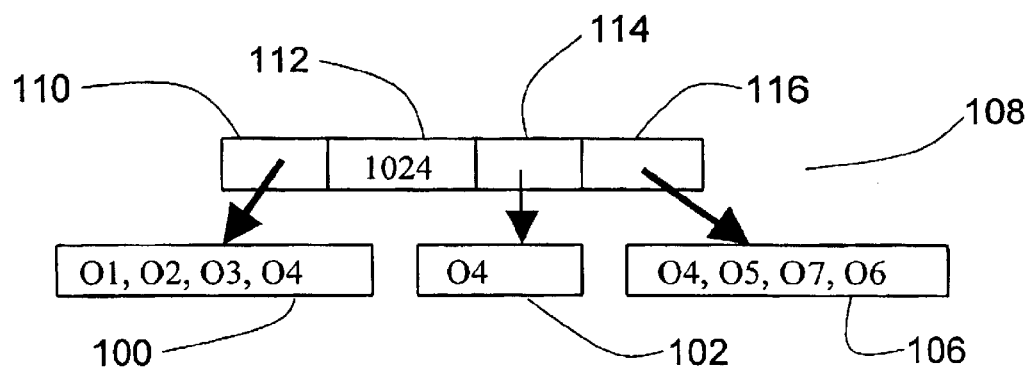
Figure 11(b)
| Packet headers | | | | Rule or Action |
|---|---|---|---|---|
| Header 1 | Header 2 | .... | Header K | |
Figure 12
| Split Dimension | Match Type |
|---|---|
| Dest. | Prefix |
| Src | Prefix |
| Protocol | Exact |
| Src Port | Range |
Figure 13

| Smaller | Value | Equal | Bigger |
|---------|-------|-------|--------|
Figure 14
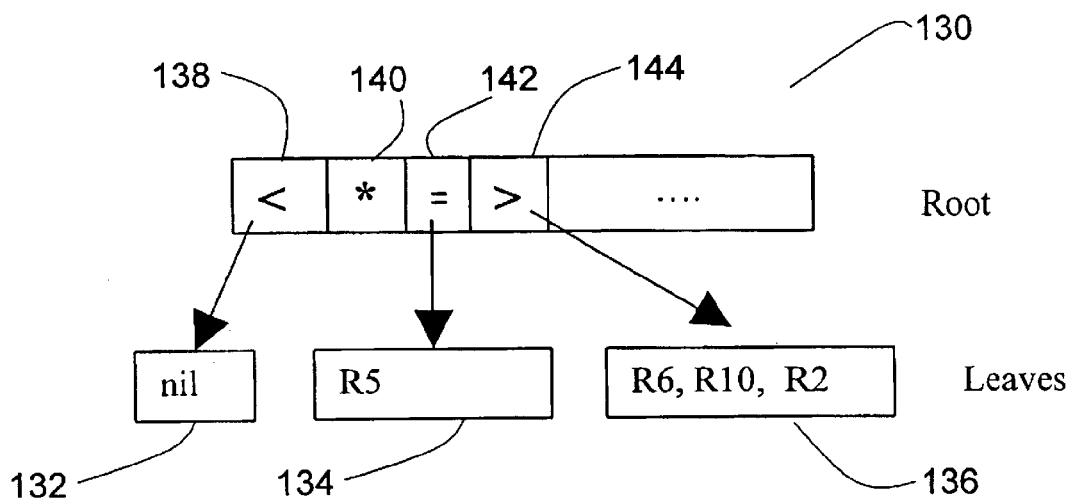
Figure 15
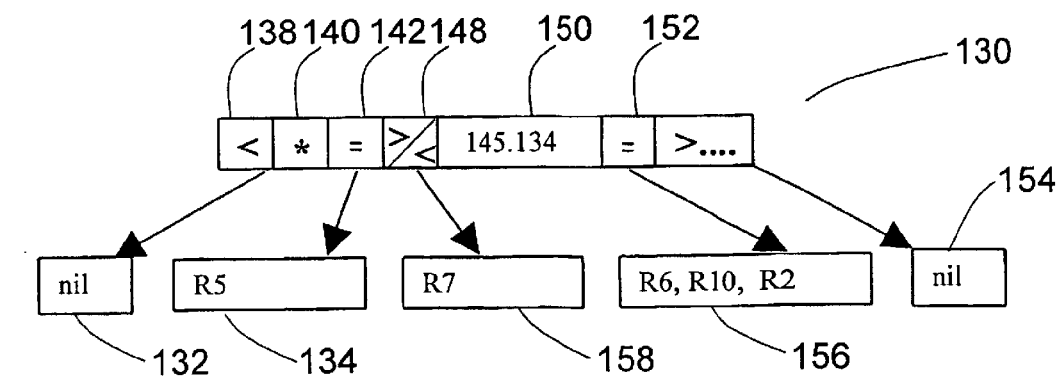
Figure 16

| Destination | Source | Dest. Port | Source Port | Protocol | Priority | Comment | Id |
|---|---|---|---|---|---|---|---|
| 145.134.56.129 | 134.214.* | 25 | * | * | 5 | Allow inbound mail | R1 |
| 145.134.* | * | 53 | * | UDP | 5 | Allow DNS access | R2 |
| 145.134.* | 128.241.* | 53 | * | * | 2 | Secondary access | R3 |
| 145.134.* | * | 23 | * | * | 4 | Incoming Telnet | R4 |
| * | 145.134.56.80 | 80 | 80 | TCP | 4 | Out http connection, allow | R5 |
| 145.134.* | * | 80 | 80 | TCP | 2 | In http connection, allow | R6 |
| 145.134.56.125 | 64.* | 123 | 123 | UDP | 5 | NTP time info | R7 |
| 225.* | * | 150 | 150 | TCP | 5 | Multicast, OK | R8 |
| * | 145.134.* | * | * | * | 4 | Out going packet | R9 |
| 145.134.* | * | * | * | TCP ack | 4 | Return Acks OK | R10 |
| * | * | * | * | * | 1 | Block everything! | R11 |

Figure 30

METHOD AND APPARATUS FOR BUILDING AND USING MULTI-DIMENSIONAL INDEX TREES FOR MULTI-DIMENSIONAL DATA OBJECTS

REFERENCE TO PRIOR APPLICATION FROM WHICH BENEFIT OF PRIORITY IS CLAIMED

This application is a continuation-in-part of application Ser. No. 09/474,452, filed Dec. 29, 1999, now pending.

FIELD OF THE INVENTION

The parent invention relates to comparing and sorting data strings, and in particular, to comparing and sorting data strings of different lengths, such that the data strings can be queried using tree structures. Specifically, the invention relates to performing this process on data strings of different lengths that may be prefixes of each other.

The present invention relates to building a multi-dimensional index tree that indexes multi-dimensional data objects on a single dimension, but changes the indexing dimension when too many data objects map to a single point within a dimension.

BACKGROUND OF THE INVENTION

A: Background of the Parent Invention

Data matching, and in particular, prefix matching is known and applied to various applications. In general, a database search is performed for data strings which are associated with a given input string or key. The association between the input string and the data strings, which is the search criteria, depends on the particular application. The particular search may require locating the longest, shortest or all data strings which are a prefix of a query string. The applications in which such matching is useful are numerous and, in particular, include layer 3 and layer 4 switching in TCP/IP protocols, directory lookup in a telephone context, on-line dictionaries and spell checkers, to name just a few.

The prefix matching problem constitutes the essential part of some applications in the computer realm and related area. The assumption in the prior art relating to these applications is that there are strings of an alphabet $\Sigma$ which are ordered. The strings can have different lengths and can be prefixes of each other. The data strings are stored in a database along with other associated data.

A user may want to find the longest, smallest or all strings which are a prefix of a query string. In other applications, a user may be interested in finding all the data strings, such that a given input string is a prefix of them. It is very important to respond to any such query in a reasonable amount of time and in as efficient a manner as possible. Each application may have its own alphabet set and the number of characters in the alphabet handling these queries determines the complexity of the search.

The number of hosts on the Internet grows rapidly everyday. New data intensive applications such as multimedia, hypertext data, video conferencing, remote imaging, etc., cause the data traffic to explode. These applications demand higher bandwidth on the communication line and faster and more efficient computer networks. To keep up with these demands and the traffic, the speed of communication lines has been increased to several gigabits per second in the last few years. As a result, routers must forward IP packets more efficiently. Routers search the Internet Protocol (IP) routing tables to find the address of the next hops (or hubs) to which the packet is to be forwarded on the path towards the final destination. Each router has its own routing table consisting of pairs of prefixes of networks addresses and their corresponding hops. The routers usually must determine the longest matching network prefix with a packet destination address and take the corresponding hop. Finding the next hop for each packet becomes harder and harder because the increasing number of hosts on the Internet expands the global network and increases the number of hops to go through. Therefore, the size of the routing table grows accordingly. Increasing the speed of data links helps to shorten the time to send a packet. Advances in the semiconductor technology improve the processing capability of CPU chips and can help reduce the time of the table lookup. However, because the link speed grows faster than the processing speed, and the size of data is growing also, the IP lookup problem is resulting in a serious bottleneck on the information superhighway. The alphabet in this application is very limited (only $\{0,1\}$), however the problem is very challenging.

The IP lookup or layer 3 switching is not the only application of prefix matching of the $\{0,1\}$ alphabet in routers. Internet Service Providers (ISPs) like to provide different services to different customers. Some organizations filter packets from the outside world by installing firewalls in order to deny access to unauthorized sources. Supporting this functionality requires packet filtering or packet classification mechanisms in layer 4 of TCP/IP protocols. Forwarding engines must be able to identify the context of packets and classify them based on their source and destination address, protocols, etc., or on all of this information. This classification must be performed at the wire speed. Routers attempt to handle this by keeping a set of rules which applies to a range of network addresses. Therefore, again we encounter the prefix matching problem in two dimensional space; i.e., for source and destination addresses of a packet.

Applications of prefix matching are not restricted to layer 3 and 4 switching. Some other useful applications include directory lookup in a telephone context, on-line dictionaries, spell checkers and looking up social security numbers. U.S. Pat. No. 5,758,024 discloses the prefix matching problem relating to computer speech recognition and proposes a compact encoding pronunciation prefix tree scheme. A method to improve the parsing process of source codes which use prefix matching is also disclosed in U.S. Pat. No. 5,812,853. The approach in this disclosure identifies the previously-parsed prefixes of a source, creates parsers in the parser states corresponding to the identified prefix and parses the remaining portion of the translation unit. Finally, U.S. Pat. No. 4,464,650 discloses an apparatus and method using prefix matching in data compression. Data compression is crucial in database applications as well as in data communication. The patent includes parsing the input stream of data symbols into the prefix and data segments, and using the previously longest matching prefixes to compress the data.

Traditionally, the prefix matching search has been performed by the Trie structure. A trie is based on the "thumb-index" of a large dictionary in which a word can be located by checking consecutive letters of a string from the beginning to the end. A trie is essentially an m_way tree whereas a branch in each node corresponds to a letter or character of alphabet $\Sigma$. A string is represented by a path from the root to a leaf node. The trie structure may be modified and applied to all of the applications discussed above. In some applications, for example in the longest prefix matching IP lookup context, researchers have been able to handle the problem in some more subtle ways than the trie structure, due in part to the limited number of characters in the alphabet. These methods do not have the generality or broad applicability of the trie structure. The main problems with trie structures are its inflexibility; i.e. the number of branches corresponds to the number of characters, and having additional blank nodes as place holders. Furthermore, in general, the search time is proportional to the length of the input strings.

Patricia Trie modified the binary trie by eliminating most of the unnecessary nodes and the modification is the basis of several new methods that have been proposed in the last several years. These approaches attempt to check several characters, or several bits, at each step, instead of checking only one character. Because checking several characters may deteriorate memory usage and leave many memory spaces unused, all of these approaches try to minimize the memory waste. V. Srinivasan and G. Varghese, in "Fast Address Lookups using Controlled prefix", Proceedings of ACM Sigmetrics, September 1998 proposed to expand the original prefixes (strings) into an equivalent set of prefixes with fewer lengths, and then, apply a dynamic programming technique to the overall index structure in order to optimize memory usage. Other methods proposed a specific case wherein local optimization of memory usage was applied in each step. This is the case in S. Mission and G. Karlsson's, "Fast Address Look-Up for Internet Routers", Proceedings of IEEE Broadband Communications 98, April 1998. Finally, a new scheme from Lulea University of Technology, attempts to reduce the size of the data set (routing table) so that it fits in the cache of a system. See Mikael Degermark, Andrej Brondnik, Suante Carlson and Stephen Pink's, "Small Forwarding Tables for Fast Routing Lookups", Proceeding of SIGCOMM., 1997.

All of these multi-bit trie schemes are designed for the IP lookup problem and may work well with the existing size of data, the number of prefixes in the lookup table and with the current IP address length, which is 32. Nonetheless, these schemes generally do not scale well for larger size data or data of longer string length, for example, the next generation of IP (Ipv6) with 128 bit address.

A barrier to applying well known data structures, such as the binary search tree, to the prefix matching problem, is the lack of a mechanism to sort and compare strings of different lengths when the strings are prefixes of each other. Therefore, what has been needed is a new comparison, indexing and searching method and apparatus for performing prefix matching, that functions independent from the lengths of data or input strings, and is general enough in structure to apply to most, if not all, applications. Thus, a method and apparatus was needed that was generic and independent of any alphabet or character structure, while efficient in memory usage and search time.

In particular, efficient prefix trees for quickly accessing data were needed in applications which involve matching strings of different lengths of a generic alphabet $\Sigma$. In addition to exact match queries, the tree must also allow for the following queries: (1) finding the longest string which is a prefix of a given query string; (2) finding the smallest prefix of a given query string; (3) listing all the strings which are prefixes of a given query string; and (4) finding all the strings such that a given query string is a prefix of them.

B: Background of the Present Invention

The present invention discloses two methods for multi-dimensional indexing. Multidimensional indexing is a crucial part of a wide range of applications, including geographical databases, image databases, spatial databases, time series, packet classification, etc. Some other applications such as feature-based indexing or similarity matching can be transferred into the multi-dimensional indexing scheme by specifying each data object with attributes. In general, when the data objects cannot be uniquely identified by an attribute or key, we have to index them based on different keys in order to efficiently update the stored data and process queries. In traditional relational database management systems, whenever one primary key cannot not uniquely identify a row, we have to use index tables based on the different keys. This is an old issue in the database community and many data structures such as the K-D-B-tree or the R-tree have been proposed. However, with new emerging multimedia and image processing applications, more efficient data access methods are need than provided by the traditional structures.

The size of Internet grows continually and the data traffic on it explodes. Everybody wants to join in this environment. Applications like e-commerce and on-line sales have affected our daily lives very deeply. Also, internet users and companies have developed more concerns more about their privacy and security. For instance, some companies want to limit outside access to their internal resources. They may deny FTP (File Transfer Protocol) access to their computer systems. Therefore, firewalls have to recognize all ftp packets originating from the outside the company. Parents may not consider content of some sites on the World Wide Web appropriate for their children and may want to deny access to them. These protections imply filtering, and consequently packet classification. How to provide this filtering is one of the main problem for the Internet community. Filtering or packet classification is performed using rules. Each rule consists of headers identifying the packet flow, like the source and destination addresses, the source and destination ports, protocol, etc, and the action or policy which has to be applied to the packet flow. Each packet is compared with each rule and if the content of the packet match the rule, the action or policy in the rule is applied to the packet.

Linearly comparing the packet header with every rule in a database is very slow. In high speed routers, this filtering function is a bottleneck for the whole communication system. A better packet classification technique is needed in order to efficiently locate rules matching a data packet.

Also, some applications like video on demand and multimedia require some type of Quality of Service (QoS). Internet Service Providers (ISPs) like to provide different kind of services for their customers. For instance, they may want to have different billing policy for different types of data flows, or they may want to reserve some bandwidth for a special company. Thus, their forwarding engines have to categorize packets based on the TCP/IP header in order to apply the company's policy or generate billing lists, because it is impossible to identify packet flows based on only one header value. Therefore, any system seeking to provide QoS has to classify packet streams based on different header values. Again, this precipitates the familiar n-dimensional indexing problem.

A few difficulties have made the packet classification problem more challenging than just regular multidimensional indexing. First, as the communication line speed increases, there is a reduction the available time to process each packet. For instance, considering the minimum Ethernet packet length, in a system with a 10 Gbs (giga bit per second) line speed, the system is left with about 50 nanoseconds to classify and decide the fate of the packet. This small amount of time dictates that the classification search engine must be very efficient. Second, difficulties arise when different types of matching are needed (whether they be exact matching, prefix matching, or range matching). Unfortunately, none of the previously-existing multi-dimensional indexing methods can handle all of these types of matching at the same time.

To address these problems and provide an efficient packet classification system, two indexing approaches are disclosed. Both approaches are efficient enough to deal with high-speed data rates while handling all three types of matching. Subsets of the disclosed methods can be applied to regular multi-dimensional problems in the database realm such as feature-based indexing or spatial databases. The idea behind the first approach is to divide dataspace by three instead of two. Then, in order to avoid a high dimensionality problem, the method always divides the dataspace based on one dimension first. If this is not possible, the scheme changes the split dimension. Therefore, the method always keeps the split values of a single dimension in the split nodes. The second approach disclosed herein uses the same technique with the exception that it keeps a bit in the split nodes to indicate whether the split dimension needs to be changed. The use of the equal bits allows for the dataspace have the functionality of the "divide by three" method while in actuality only dividing the dataspace by two. This elimination of a subspace improves memory allocation.

SUMMARY OF THE INVENTION

A: Summary of the Parent Invention

The parent invention provides a method and apparatus for matching data strings of different lengths, wherein one data string may be the prefix of another data string. The method and apparatus include comparing and sorting data strings of different lengths and utilizing data tree structures to search for matching data strings, as well as prefixes of a given string. The parent invention applies to data strings comprised of letters or characters from any alphabet or database.

A method is provided for matching strings of different lengths, wherein the strings can be prefixes of each other and can be from any alphabet $\Sigma$. Applications of this parent invention are numerous. When the alphabet is alphanumeric, the possible applications include on-line dictionaries, spell checkers, telephone directory lookup, computer speech recognition, data compression, source code compiling, as well as others. However, the most crucial applications of (prefix) string matching of different lengths are in layer 3 and 4 switching in the $\{0,1\}$ alphabet set, and in particular, when routers try to forward IP packets in Internet or classify packets for providing different types of services for different customers.

The method and apparatus of the parent invention provide for comparing data strings of different lengths, sorting the data strings of different lengths based on this comparison and building tree structures for searching strings, as well as prefixes, within a large data set. A binary prefix tree is provided that efficiently utilizes machine memory space and gives a search performance comparable to the typical binary search tree. A static m_way prefix tree is also provided to get better search performance. Finally, a dynamic m_way prefix tree is provided, which performs well in data environments with high levels of transactions. The proposed method and apparatus, including the data structures, are simple to implement in hardware and software, scalable to accommodate large data sizes, independent from the data string lengths, flexible enough to handle higher dimension data and applicable to any character alphabet.

Specifically, according to one aspect of the parent invention a method is provided for comparing a data set comprised of at least two data strings of indeterminate length in a common character set, with the method comprising comparing said data strings to identify the existence, or nonexistence, of a common prefix portion. If a common prefix portion exists, then setting a specific check point character such that the probability of a character in the character set being greater than the check point character is about equal to the probability of a character in the character set being less than the check point character. If the common prefix portion comprises the entirety of one of said data strings, then comparing a first additional character in a longer length data string to the check point character to determine if the first additional character is less than or equal to the value of the check point character, with the longer length data string having a lesser value if the value of the first additional character is less than or equal to the value of the check point character and the longer length data string having a greater value if the first additional character is greater than the value of the check point character.

If the common prefix portion comprises less than the entirety of said data strings, then comparing a first discriminant character in each of the data strings to determine if one discriminant character is less than or greater than another discriminant character, and if the value of the first discriminant character of one of the data strings is less than the first discriminant character of another data string, the data string having a lesser value than another data string, if the value of the first discriminant character of one of the data strings is greater than the first discriminant character of another data string, the data string having a greater value than another data string. Finally, if the value of the first discriminant character or each data string is equal, comparing the next character in each data string.

If no common prefix portion exists, then the method compares the first character in one data string to the first character of another data string to determine if the first character is less than or greater than the value of the first character of the another data string. If the value of the first character is less than the first character of the another data string, then the data string has a lesser value. If the value of the first character is greater than the first character of the another data string, then the data string has a greater value. Finally, if the value of the first character is equal to the first character of the another data string, comparing the next character in each data string.

The method may further provide the step of sorting the data strings based on the data string value and may include first placing data strings having a common prefix portion into the sorting bag of the common prefix. Further, the method may first sort the data strings having no common prefix portion and then sort the data strings in the sorting bag.

The method may further comprise the step of recursively dividing the sorted data strings into two data spaces to build a binary search tree or recursively dividing the sorted data strings into more than two data spaces to build a static m_way tree. The tree may be divided such that the method first determines the data string having the shortest character length before recursively dividing the data strings into two data sets, with the data strings of lower value than the data string having the shortest character length and the data strings of higher value than the data string having the shortest character length divided into different sub-trees based on the shortest length data string.

In building the dynamic m_way tree additional data strings may be dynamically inserted into the tree to build a dynamic m_way tree. The m_way tree may be divided into two sub-trees if the number of elements at a node exceeds a pre-determined value or if the data strings at a node include a common prefix portion of the node data element. The m_way tree may further be divided into two sub-trees at a median point if the data strings at the node do not include any common prefix portion of the node data element.

The method further comprises dynamically inserting additional data strings by replacing a data element with an inserted data element if the inserted data element is a common prefix portion of the replaced element, then sorting all other data elements in the sub-tree of the replaced data element in respect to the inserted element.

The data strings may be alphanumeric prefixes of other alphanumeric data strings and the step of searching may provide for searching using an alphanumeric argument of the prefix. The method may further provide for data strings that are prefixes of network addresses in TCP/IP protocols along with a hops name and associated address in a router and further comprise the step of searching the data strings using a packet destination address to find a longest prefix match. The method may transmit data to the hop associated with the longest matching network address.

In the method, the data strings may be prefixes of network addresses in TCP/IP protocols along with port numbers, protocol name and address associated with the network address in a router, with the method further comprising using host addresses contained in the TCP/IP packet for searching and classifying packets based on the source and destination address. The host address may be contained in a TCP/IP packet with the method further comprising switching packets in layer 3 or layer 4 of the TCP/IP protocol.

The method, when transmitting packet information, may further comprise transmitting or filtering packet information using packet classification information and provide differentiated service or data protection based on the packet classification information.

The method may comprise determining the longest prefix string of a query string based on the sorted data elements or determining the shortest prefix string of a query string based on the sorted data elements. The method may also comprise determining all prefix data strings of a query string based on the sorted data elements or determining all data strings of which the query string is a prefix based on the sorted data elements.

In another aspect of the parent invention a method is provided for comparing, sorting and searching a data set comprised of at least two data strings of indeterminate length in a common character set. The method comprises comparing said data strings to identify the existence, or non-existence, of a common prefix portion. If a common prefix portion exists, then setting a specific check point character such that the probability of a character in the character set being greater than the check point character is about equal to the probability of a character in the character set being less than the check point character.

If the prefix portion comprises the entirety of one of said data strings, then comparing a first additional character in a longer length data string to the check point character to determine if the first additional character is less than or equal to the value of the check point character, with the longer length data string having a lesser value if the value of the first additional character is less than or equal to the value of the check point character and the longer length data string having a greater value if the first additional character is greater than the value of the check point character.

If the common prefix portion comprises less than the entirety of said data strings, then comparing a first discriminant character in each of the data strings to determine if one discriminant character is less than or greater than another discriminant character. If the value of the first discriminant character of one of the data strings is less than the first discriminant character of another data string, the data string having a lesser value than another data string. If the value of the first discriminant character of one of the data strings is greater than the first discriminant character of another data string, the data string having a greater value than another data string. Finally, if the value of the first discriminant character of each data string is equal, comparing the next character in each data string.

If no common prefix portion exists, the method compares the first character in one data string to the first character of another data string to determine if the first character is less than or greater than the value of the first character of the another data string. If the value of the first character is less than the first character of the another data string, then the data string has a lesser value. If the value of the first character is greater than the first character of another data string, then the data string has a greater value. Finally, if the value of the first character is equal to the first character of the another data string, comparing the next character in each data string.

The method further provides for sorting the data strings based on the data string value, building a search tree and searching the data strings using the search tree.

The method may comprise the step of first placing data strings having a common prefix portion into a sorting bag.

The data strings may be prefixes of network addresses in TCP/IP protocols along with a hops name and associated address in a router, with the method further comprising the step of searching the data strings using a host address of a computer network to find a longest prefix match. Further, the method may provide for transmitting packet information associated with the network address to a device associated with the longest matching network address. The host address may be contained in a TCP/IP packet, with the method further comprising switching packets in layer 3 or layer 4 of the TCP/IP protocol.

The data strings may be prefixes of network addresses in TCP/IP protocols along with port numbers, protocol name and address associated with the network address in a router, with the method further comprising using host addresses contained in the TCP/IP packet for searching and classifying packets based on the source and destination address.

In yet another aspect of the parent invention a router for forwarding data packets is provided, wherein the router finds the next hop for each packet by finding the longest data prefix matching a packet destination address and a corresponding hop from a prefix lookup table, wherein data strings are of indeterminate length in a common character set. The router comprises a comparator for comparing said data strings to identify the existence, or non-existence, of a common prefix portion, and wherein if a common prefix portion exists, the comparator sets a specific check point character such that the probability of a character in the character set being greater than the check point character is about equal to the probability of a character in the character set being less than the check point character. If the prefix portion comprises the entirety of one of said data strings, then the comparator compares a first additional character in a longer length data string to the check point character to determine if the first additional character is less than or equal to the value of the check point character, with the longer length data string having a lesser value if the value of the first additional character is less than or equal to the value of the check point character and having a greater value if the first additional character is greater than the value of the check point character.

If the common prefix portion comprises less than the entirety of said data strings, then the comparator compares a first discriminant character in each of the data strings to determine if one discriminant character is less than or greater than another discriminant character. If the value of the first discriminant character of one of the data strings is less than the first discriminant character of another data string, then the data string has a lesser value than another data string. If the value of the first discriminant character of one of the data strings is greater than the first discriminant character of another data string, then the data string has a greater value than another data string. If the value of the first discriminant character of each data string is equal, the comparator compares the next character in each data string.

If no common prefix portion exists, then the comparator compares the first character in one data string to the first character of another data string to determine if the first character is less than or greater than the value of the first character of another data string, and if the value of the first character is less than the first character of another data string, the data string has a lesser value. If the value of the first character is greater than the first character of another data string, the data string has a greater value. If the value of the first character is equal to the first character of the another data string, the comparator compares the next character in each data string.

The router also includes a sorter for sorting the data strings based on the data string value and a database builder for building a search tree. The router may also comprise a search engine for finding the longest matching data string to a data packet. Additionally, the router may comprise a transmitting unit for transmitting the hop associated with the longest matching network address.

The host addresses contained in the TCP/IP packet may be used by the router to search and classify packets based on the source and destination address. With the host address contained in a TCP/IP packet, the router switches packets in layer 3 and layer 4 of the TCP/IP protocol.

The router may further comprise a transmitting unit providing differentiated service or data protection based on the packet classification information.

B: Summary of the Present Invention

The present invention provides a method and apparatus for building a multi-dimensional index tree for use in searching for indexed data objects. The data objects to be indexed have a plurality of dimensions, and each data object has a key within each dimension. Under the method of the present invention, the data objects are indexed on the basis of their keys within a dimension that is being used to classify the data objects (the split dimension). Leaf nodes are filled with data objects, and as the leaf nodes overflow with data objects, they are subdivided into subtrees. A split node is used to index how the data objects are placed into the subtrees. This split node indexes the data objects in the leaf node having an overflow on the basis of the key within the data objects that is associated with the split dimension of the split node.

Specifically, a method is provided for building a multi-dimensional index tree for use in searching for data objects. This method comprises placing a data object into an appropriate leaf node. The leaf nodes of the present invention have a predetermined capacity for data objects, and each data object has a plurality of keys. Each of these keys are associated with a split dimension. The leaf node is divided into N subtrees when the leaf node is filled with a number of data objects exceeding its capacity. As with the leaf nodes, each of subtree has a predetermined capacity for data objects. The number N is at least two. Next, the data objects in the excessively-filled leaf node are indexed into an appropriate subtree on the basis of a first split dimension if the data objects in the excessively-filled leaf node can be identifiably separated on the basis of the first split dimension. If the data objects in the excessively-filled leaf node cannot be identifiably separated on the basis of the first split dimension, they are indexed into an appropriate subtree on the basis of a different split dimension under which those data objects can be identifiably separated. Thereafter, each of the above-disclosed steps are repeated until all data objects presented for placement have been indexed. It must be noted that leaf nodes are subtrees and subtrees are leaf nodes. That is, once a leaf node is divided into N subtrees, the subtrees are the leaf nodes that contain the indexed data objects.

The step of indexing the data objects may comprise splitting data objects in an excessively-filled leaf node on the basis of a key within each of those data objects that is associated with the first split dimension, creating a split node associated with the first split dimension pointing to each of the new subtrees (if the split of data objects is an initial split), or supplementing a split node that was created upon the initial split with pointers pointing to each of the new subtrees (if the split of data objects is not an initial split), and placing each of said data objects in said excessively-filled leaf node into an appropriate subtree. These steps would be performed if the data objects in an excessively-filled leaf node can be identifiably separated on the basis of the keys in those data objects that are associated with a first split dimension.

The step of indexing the data objects may also comprise changing the first split dimension to a new split dimension, splitting the data objects in the excessively-filled leaf node on the basis of a key within each of said data objects associated with the new split dimension, creating a split node associated with the new split dimension pointing to each of the new subtrees, and placing each of the data objects in the excessively-filled leaf node into an appropriate subtree. These steps would be performed if the data objects in the excessively-filled leaf node cannot be identifiably separated on the basis of the first split dimension. It must be noted that the new split dimension under which the data objects eventually will be split will be a dimension under which the data objects can be identifiably separated. It also must be noted that as the process repeats itself, the split dimensions of each split node will remain the same so when a new data object is presented for placement, the method will first try to place index the data object using the first split dimension, and then if not the first split dimension, then the next split dimension of the next split node, and so on.

In one aspect of the invention, the excessively-filled leaf nodes are divided into three subtrees. In this aspect of the invention, the split node used to index the split data objects has a space occupied by a pointer pointing to a first subtree, a space occupied by a split value, a space occupied by a pointer pointing to a second subtree, and a space occupied by a pointer pointing to the third subtree. The split value will depend upon the match type (exact, range, or prefix) that is associated with the split dimension under which the data objects are being split. Data objects having a key (in the split dimension of interest) that is less than the split value will be placed in the first subtree. Data objects having a key (in the split dimension of interest) that is equal to the split value will be placed in the second subtree. Data objects having a key (in the split dimension of interest) that is greater than the split value will be placed in the third subtree.

In another aspect of the invention, the excessively-filled leaf nodes are divided into two subtrees. In this aspect of the invention, the split node used to index the split data objects has a space occupied by a first equal bit, a space occupied by a pointer pointing to a first subtree, a space occupied by a split value, a space occupied by a second equal bit, and a space occupied by a pointer pointing to a second subtree. The split value will depend upon the match type (exact, range, or prefix) that is associated with the split dimension under which the data objects are being split. Data objects having a key (in the split dimension of interest) that is less than or equal to the split value will be placed in the first subtree. Data objects having a key (in the split dimension of interest) that is greater than the split value will be placed in the second subtree. The equal bits are used to track when all data objects in the subtree associated with the split value share the same pertinent key (the key under which the data objects have been indexed). An equal bit will be set if all of the data objects in its associated subtree share the same key and those data objects have been split under a new split dimension because of an overflow. Also disclosed herein are three solutions to problems that emerge when attempting to index data objects using the equal bit split node.

A discrimination ratio can be used to set the priority of split dimensions in a way that will allow for a faster search time. Also disclosed herein is a method of searching the multi-dimensional index tree produced in accordance with the present invention.

Also disclosed herein is the multi-dimensional index tree of the present invention. This multi-dimensional index tree comprises an upper level comprising an upper level split node having at least one split value. The upper level split node has pointers pointing to each upper level subtree and at least one pointer pointing to a split node in a lower level. The upper level has at least N upper level subtrees, each of the upper level subtrees being associated with an upper level split value. Also included in the upper level are a plurality of indexed upper level data objects, each of these upper level data objects having a plurality of keys, each of these keys being associated with a different split dimension. Each of the upper level data objects are indexed into the upper level subtrees on the basis of a key within the upper level data objects that is associated with a split dimension for the upper level. The index tree also comprises a lower level comprising at least one lower level split node having at least one split value and pointers pointing to each lower level subtree. The lower level also comprises at least M lower level subtrees, each of the lower level subtrees being associated with a lower level split dimension. Also included in the lower level are a plurality of indexed lower level data objects, each of the lower level data objects having a plurality of keys, each of these keys being associated with the lower level split dimension. Each of the lower level data objects are indexed into the lower level subtrees on the basis of a key within the lower level data objects that is associated with a split dimension for the lower level, the lower level split dimension being different than said upper level split dimension.

In one aspect of the invention, the upper level has at least two upper level subtrees, and the upper level split node has a space occupied by a pointer pointing to a first subtree, a space occupied by a split value, a space occupied by a pointer pointing to a second subtree, and a space occupied by a pointer pointing to a third subtree. If there are only two subtrees in the upper level, the space pointing to the equal subtree will be pointing to a lower level split node that has been created from an excessively-filled equal subtree. The lower level will have at least three subtrees if the lower level is in fact the bottom level. The configuration of the split node for the lower level will be the same as that in the upper level.

In another aspect of the invention, the upper level has at least one upper level subtree, and the upper level split node has a space occupied by a first equal bit, a space occupied by a pointer pointing to a first subtree, a space occupied by a split value, a space occupied by a second equal bit, and a space occupied by a pointer pointing to a second subtree. If there is only one subtree in the upper level, the space pointing to the first subtree will be pointing to a lower level split node that has been created from an excessively-filled first subtree. In such a case, the first equal bit would be set. The lower level will have at least two subtrees if the lower level is in fact the bottom level. The configuration of the split node for the lower level will be the same as that in the upper level. The operation of the equal bit will be the same as described in the second aspect of the disclosed method.

Also disclosed herein is a router that uses the index tree of the present invention. The router is capable of building the index tree of the present invention and then using the built index tree to match incoming data packets with an indexed rule. Because of the improved design of the index tree of the present invention, the router will be able to more quickly locate matching rules, and can efficiently provide switching in layers 3 and 4 of the TCP/IP protocol, and can provided differentiated service based on rules in the index tree.

These and other features and advantages of the method and apparatus of the parent and present invention, will be in part apparent, and in part pointed out hereinafter.

BRIEF DESCRIPTION OF THE DRAWINGS

FIG. 11 is an illustration of how ranges can be handled in the disclosed index trees FIG. 11(a) shows data objects as lines in one dimensional space and FIG. 11(b) (b) illustrates them after a split in the data space.

FIG. 12 is an illustration of a sample rule in IP packet classification applications.

FIG. 13 is an example of a split table for the IP packet classification applications.

FIG. 14 is an illustration of an example of a split node of the index tree disclosed herein as the first embodiment.

FIG. 15 is an illustration of the index tree of example 1.

FIG. 16 is a further illustration of the index tree of example 1 as more data objects have been indexed.

FIG. 30 is a table of IP packet classification rules.

DETAILED DESCRIPTION OF THE PREFERRED EMBODIMENTS

A: The Embodiments of the Parent Invention

Figures 1, 2:
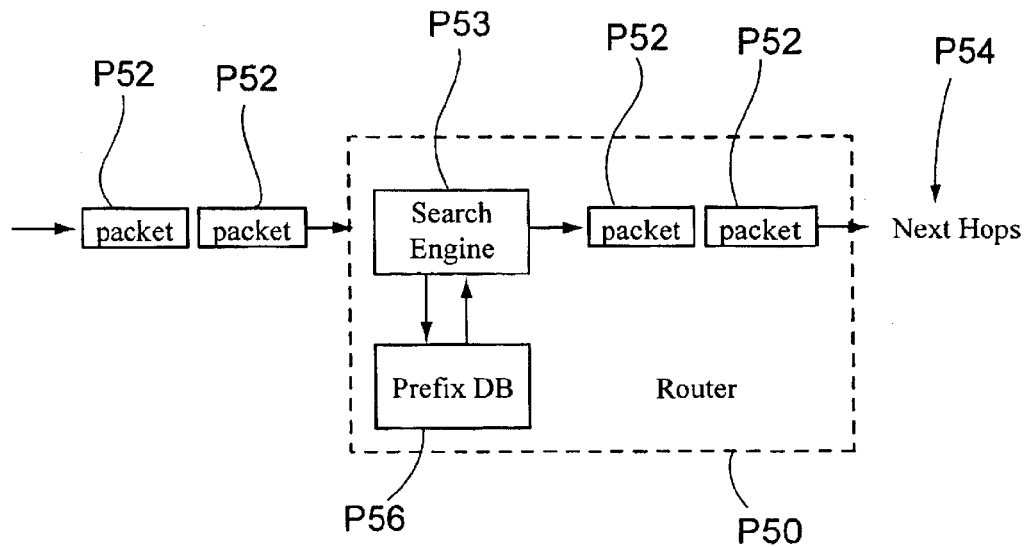
FIG. 1 is a block diagram of a typical packet forwarding process in a router.
FIG. 2 is a database of prefixes in the {0,1} alphabet.

A typical packet forwarding process in a router P50 is shown generally in FIG. 1. In the router P50, each IP packet P52 contains a destination address. The router P50 must determine for each packet P52 the address of the next hop P54 to which the packet must be forwarded. The router P50 performs this function by checking the destination address using a search engine P53 and finding the longest matching data string (prefix) in a prefix database P56. The database P56 consists of IP address prefixes and their corresponding hops. For example, if the destination address of the packet is 1011 0001 1000, and the database is that of FIG. 2, the packet is sent to hop 10 because the prefix 10110001* is the longest matching prefix with the packet destination address.

Figure 3:
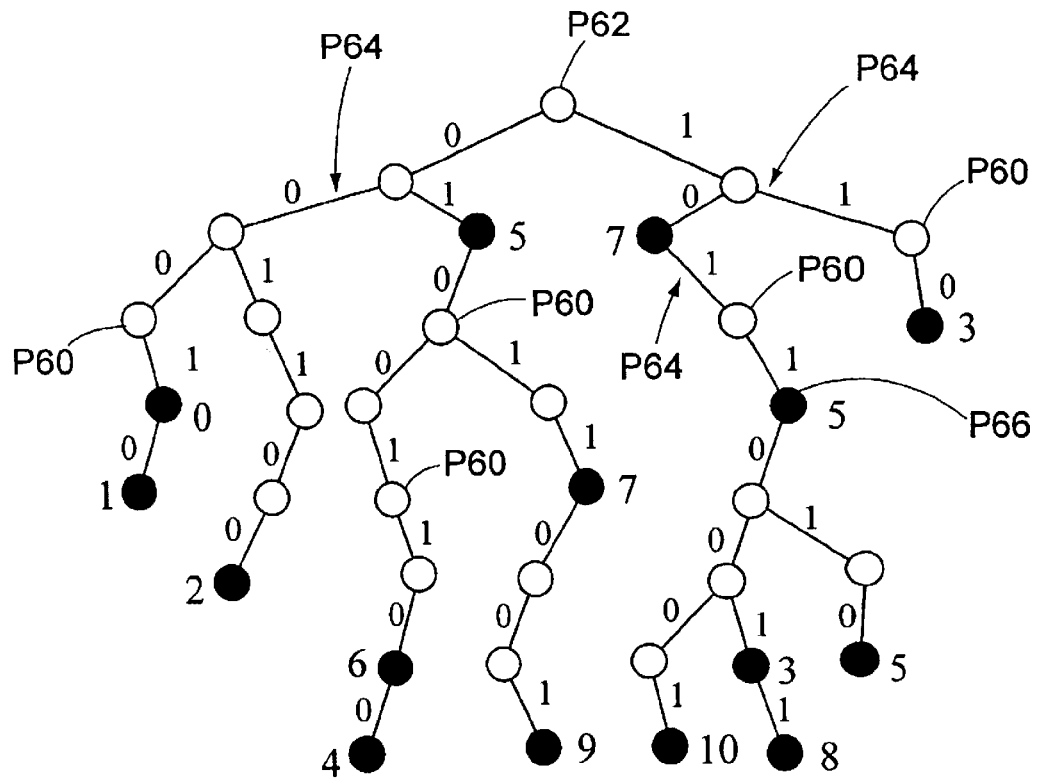
FIG. 3 is a trie in the {0,1} alphabet for the data elements of the data set of FIG. 2.

A trie P58, which is based on the "thumb-index" scheme of a large dictionary, as shown in FIG. 3 for the data strings of FIG. 2, is essentially an m_way tree wherein each internal node of a trie has m branches and each branch corresponds to a character in the alphabet. Each data string in a trie is represented by a leaf and its value corresponds to the path from the root to the leaf. In FIG. 3, m is 2 and the alphabet is only {0,1}. The blank internal nodes P60 are place holders and do not represent any data element. Starting from the root P62 and following the branches P64 corresponding to the characters in the query string to leaf P66 at each internal node in FIG. 3 is a prefix in the path from the root to the end leaf. In this trie, the search time corresponds to the length of data elements. Further, the number of branches corresponds to the number of characters in the alphabet.

The method of the parent invention compares and sorts data sets including data strings of indeterminate length in a common character set. The method compares the data strings to identify the existence, or non-existence, of a common prefix portion (i.e., a portion of the data strings that have the same value).

If a common prefix portion comprises the entirety of one of the compared data strings, the method compares the first additional character in the longer length string to a check point character ($\perp$) to determine the values of the data strings for sorting. If the common prefix portion comprises less than the entirety of the data strings, then the method compares the first character that has a different value (i.e., the first discriminant character) to determine the values of the data strings for sorting. Finally, if no common prefix portion exists, the method compares the first character in each data string to determine the values of the data strings for sorting. If the compared value of any two characters is the same, the method then compares the next character.

The method performs the compare and sort function based on the following definition: if there are two strings $A = a_1 a_2 \ldots a_n$ and $B = b_1 b_2 \ldots b_m$ where $a_j$ and $b_j$ are characters of alphabet $\Sigma$ and there is a check point character $\perp$ which belongs to $\Sigma$, then, if n=m, two strings have the same length, the values of A and B are compared to each other based on the order of characters in $\Sigma$, and if n≠m (assume n<m), then, the two substrings $a_1 a_2 \ldots a_n$ and $b_1 b_2 \ldots b_n$ are compared to each other. The substring with the bigger (smaller) value is considered bigger (smaller) if two substrings are not equal. If $a_1 a_2 \ldots a_n$ and $b_1 b_2 \ldots b_n$ are equal, then, the (n+1)th character of the longer string is compared to the check point character. B≦A if $b_{n+1}$th is equal or before the check point character $\perp$ in the ordering of the characters in $\Sigma$, and B>A otherwise.

The check point character ($\perp$) is preferably selected in such a way that the probability of any character(s) being greater than the check point character is about equal to the probability of any character(s) being less than the check point character. For example, in the English alphabet, assuming that the probability of a character in the range A–M is about equal to the probability of a character in the range N–Z, M is selected as the check point character ($\perp$).

Applying the comparing method of the invention, BOAT is smaller than GOAT and SAD is larger than BALLOON. CAT is larger than CATEGORY because the fourth character in CATEGORY, E, is smaller than M. In the alphabet {0,1}, the parent method selects the check point character $\perp$ as 0. When applying the method of the invention, 1101 is greater than 1011 and smaller than 11101, and 1011 is greater than 101101. The method may be applied, for example, to the data set in FIG. 2 and the prefixes sorted in ascending order as follows:

00010*,0001*,001100*,01001100*,0100110*,01011001*, 01011*,01*,10*,10110001 *,1011001*,10110011*, 1011010*,1011*,110*

The method of the parent invention compares data strings preferably according to the following compare function: if there are two strings $A = a_1 a_2 \ldots a_n$ and $b_1 b_2 \ldots b_m$ where $a_j$ and $b_j$ are characters of alphabet $\Sigma$, then, A and B are matching if n=m and the two strings are identical, or (assuming m>n), two $a_1a_2 \ldots a_n$ and $b_1b_2 \ldots b_n$ substrings are the same. Otherwise, A and B are not matching.

Figure 4:
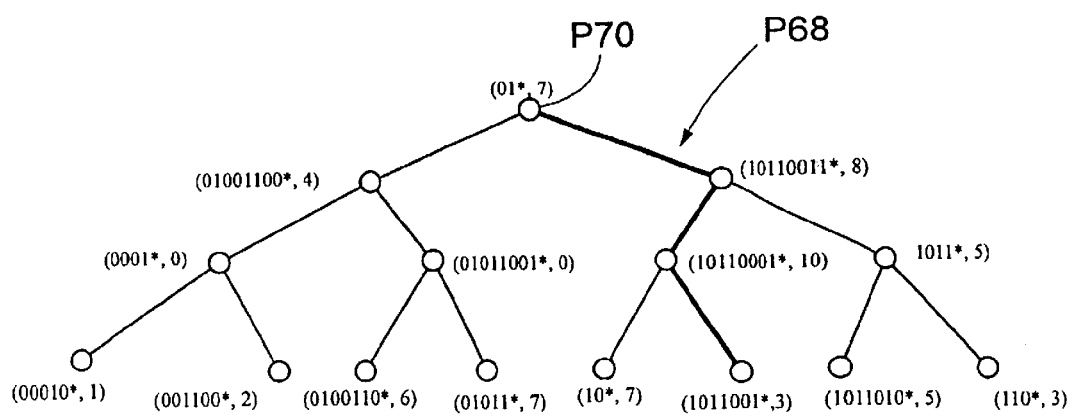
FIG. 4 is a binary balanced tree for the data elements of the data set in FIG. 2.

FIG. 4 shows the result of applying a typical binary search tree P68 to the strings (prefixes) of the database of FIG. 2. This data structure (binary search tree) identifies the longest matching prefix of string 101100011000. The thick lines show the search path for this string. The search is the same as in any binary search tree, starting from the root P70, comparing the query string with its value and following a subtree based on the comparison result. The search must be followed to the leaves to determine the longest matching prefix. The typical binary tree search fails to find the longest matching prefix of string 101100001000 because prefixes are ranges and not just a data point in the search space.

The method of the parent invention defines two data strings as disjoint if A and B are not a prefix (or substring) of each other and further defines a string S as an enclosure if there exists at least one data string such that S is a prefix of that string.

For example, in the character set defined by the English language, BAT and PHONE are disjoint, but DATE is an enclosure of DATED and DATELINE. As another example, in the {0,1} character set, 1011 is an enclosure in the data set of FIG. 2. An enclosure represents its data space as a point in the data set. All data strings in FIG. 2 which are included in the range of 1011, such as 1011001, 1011010, and 1011 itself are considered as a point represented by 1011. In the method of the parent invention, a data element may be included in an enclosure or be disjoint with all other elements.

Using the method of the parent invention, if a set of data strings are disjoint, then, a binary tree built based on the sort function of the parent method identifies the matching prefix (es) of any query string.

The parent method modifies the binary search tree in order to search a data set of strings with enclosures. The method, when building a binary tree, divides the data space into half recursives. Each subtree in the binary tree is a data space represented by the element in the root of the subtree and each enclosure is also defined as a point which includes all matching strings in its data space. The method sorts the data strings and a binary tree is constructed in a typical manner by recursively splitting the data space into two at each step. If the split point is a disjoint string the building process follows as usual. When the split point is an enclosure, all included data strings are distributed in the right and left subtree according to the compare function and the property of the binary search tree. It should be apparent to one skilled in the art that an enclosure may be chosen as split point, or a root, even though there are some other disjoint data elements. The building process is applied to the subspaces recursively.

Figure 5:
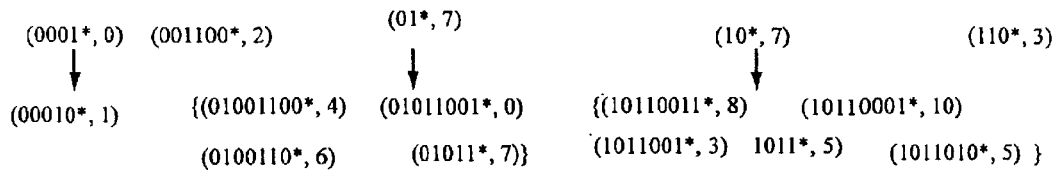
FIG. 5 is a diagram of the first stage in sorting the data prefixes in FIG. 2 according to the method of the parent invention.
Figure 6:
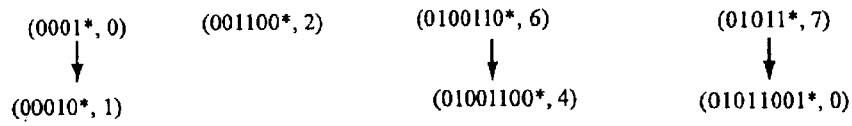
FIG. 6 is a diagram of the second stage of sorting the data prefixes in FIG. 2 according to the method of the parent invention.
Figure 7:
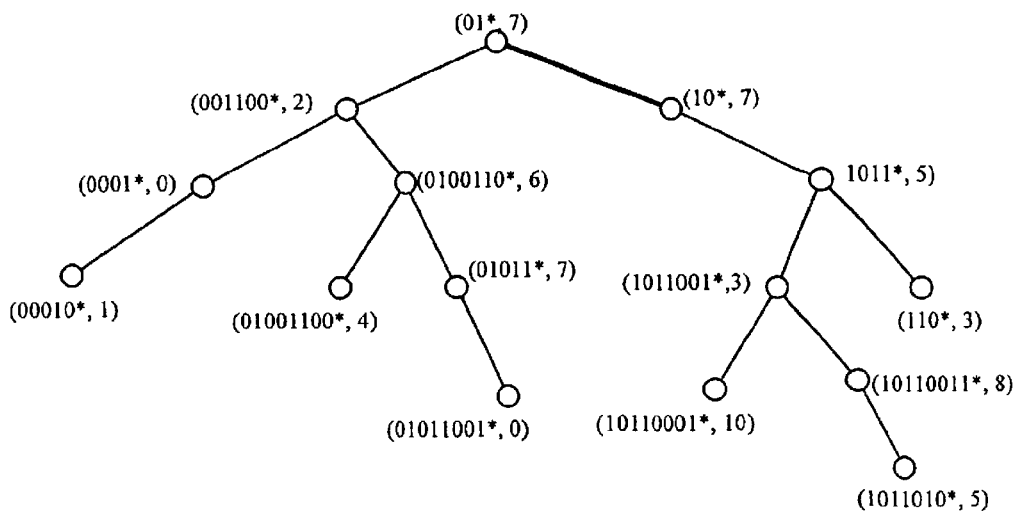
FIG. 7 is a binary prefix tree constructed using the data elements of the data set in FIG. 2.

FIG. 5 shows the result of the first sorting step in applying the method of building a binary search tree for the data set of FIG. 2. There are only five disjoint elements, 0001, 0001100, 01, 10 and 110, with 01 being the median and defined as the split point. 01 is an enclosure, and therefore all elements contained in it are distributed in two subspaces and placed on the left subspace because all of the data strings are smaller than the split point as defined. FIG. 6 shows the application of the method to the left subspace and FIG. 7 shows the final binary tree. The tree may be unbalanced, but one skilled in the art should recognize that, in the worst case, the search will take one additional step to reach the same result as the binary tree of FIG. 4, with an accurate result.

The method of the parent invention may be applied to building different tree structures, including building index structures.

The parent invention includes two procedures for sorting a set of strings with different lengths that may include enclosures. Both procedures provide that each enclosure has a bag in which all elements contained in its space are placed. The sorting procedure applied is based on the sorting definition.

The first sorting procedure is similar to "bubble sort" and defined as follows:
/* List contains all initial and sorted strings. */
Sort(List)
    for all i in List do;
        compare i with all j in List where j≠i;
            if i matches j then
                put j in i's bag.
                delete j from List.
            else if i is shorter than j, then /* i is enclosure of j */
                put i in j's bag.
                replace i with j.
                delete i from List.
            else if j<i, then,
                replace i with j.
        end compare;
    end for;
end Sort;

This procedure sorts the data strings, while filling enclosures with their data elements (enclosurizing). The enclosurizing process is applied recursively to the data set in order to build the prefix tree.

In the preferred embodiment, the sort procedure divides the data space into three, instead of two, if the split point is an enclosure. Smaller data strings are placed in the left side of the partition point, with the larger data strings in the right side. Finally, the matching elements, the strings which are in the space of the split string, are put in its bag. If the split point is disjoint with the rest of data, the regular quick sort method is used.

To identify the split element, the method preferably selects the element with the minimum length at each step. The MinLength function in the following sort procedure results in a list of strings and returns the one with the minimum length. The sort procedure is defined recursively as follows:
/* List contains all initial and sorted strings. */
Sort(List)
   if List is empty return.
   tmpMinLength(List);
   for all i in List except tmp do;
      compare i with tmp;
      if i matches tmp then
         put i in tmp's bag.
      if i<tmp then
         put i in leftList.
      if i>tmp then
         put i in rightList.
   endfor;
   List←Sort(leftList) &Sort(rightList); end Sort;
The last line in the procedure concatenates the results of sorts from the left to the right subspaces and puts it in the List. In each step, the process tries to find the most probable enclosure point, the minimal length element. Then, it partitions the data space based on the split point and puts matching elements in a bag. Therefore, by recursively applying the procedure, the final result is sorted and enclosurized. In this procedure, splitting must be based on the minimal length string.

Building a prefix binary search tree can be accomplished in a typical manner after sorting the data strings. The building process is the same as any binary search tree. It should again be apparent to one skilled in the art that any one of the disclosed sorting procedures can be used to sort the data strings. In the ordinary binary search tree the data elements are sorted once in the beginning and they remain sorted until the end. In the prefix tree, the strings in the enclosures' bags are not sorted. The sort procedures enclosurize data elements in only one level whereas some strings in the bags may be enclosures of others. The sort process is applied recursively to the subspaces.

In the parent invention a BuildTree procedure uses the general Sort procedure and takes a set of strings as the input and returns a pointer to the root of the index structure. Again any of the sort procedures may be used depending upon the application and time requirements. The BuildTree procedure is defined in a recursive format as follows:

BuildTree(List)
   If List is empty, return.
   Sort(List);
   let m be the median of List
   root←m;
   let leftList and rightList contain all elements in the left and right of m.
   if m is an enclosure, then,
      distribute elements in m's bag into leftList and rightList.
   leftChild(root)←BuildTree(leftList);
   rightchild(root)←BuildTree(rightList);
   return address of root.
end BuildTree;

It should be apparent that with data strings that are sorted, in the next application of the procedure, the procedure will provide a result faster. Preferably, the smaller and larger strings are separated into different bags and sorted and the strings within the bags do not need to be sorted initially. In an alternative embodiment, the smaller and larger data strings are sorted in the split point's bag and then concatenated with the rest of the data strings.

In an alternative embodiment, the BuildTree procedure can be defined as the following (it is assumed the data strings in List are already sorted by the Sort procedure):

BuildTree(List)
   if List is empty, return.
   let m be the median of List
   root←m;
      let leftList and rightList contain all elements in the left and right of m.
      if m is an enclosure, then,
         leftList←leftList & Sort(leftBag);
         rightList←rightList & Sort(rightBag);
      leftchild(root)←BuildTree(leftList);
      rightChild(root)←BuildTree(rightList);
      return address of root.
end BuildTree;

It should be noted that leftBag and rightBag contain data strings, which are smaller and larger respectively than the enclosure in its bag. The "&" symbol represents concatenation of two strings.

The method of the parent invention provides query processing in the binary search tree, for finding the longest, smallest and all prefixes of a set of given query strings. However, the invention is not limited to these queries and one skilled in art will appreciate other queries that may be provided by this invention.

In searching for the longest matching prefix, for example, the following procedure may be used:

/* tree is a pointer to the root of index tree and str is the query string.*/
Search(tree, str)
   if tree=NIL, return NULL;
      if (str<tree(root)) then;
      prefix←Search(leftChild(tree), str).
      else
      prefix←Search(rightChild(tree), str).
      if str matches tree(root) and prefix is NULL, then,
         prefix←tree(root).
   return prefix;
end Search;

In an IP lookup application, "str" is a packet IP address and the data elements in the tree nodes are network addresses or prefixes. It should be noted that the Search procedure always substitutes the matching prefix in the upper level with the matching prefix in the lower level.

The method of the parent invention can also find the smallest matching prefix, and the procedure is the same as finding the longest prefix, except the procedure terminates when it finds the first matching prefix. The method of the parent invention can also find all matching prefixes. In this embodiment, the procedure reports each of the prefixes instead of substituting them with the longer one at each step.

In order to find the strings in the data set of which the query string is a prefix, first, the method searches for a string such that the query string is its enclosure. Enclosures may include the exact matching string. In this query procedure, a PrintStr function recursively traverses the subtree and reports the matching prefixes with an input string:

/* tree is a pointer to the root of index tree and str is the query string.*/
Search(tree, str)
   if tree=NIL, return NULL;
      if str is an enclosure of tree(root), then,
   PrintStr(tree(root), str)
   exit;
   if (str<tree(root)) then;
      tree←Search(leftChild(tree), str).
   else
      prefix←Search(rightChild(tree), str).
end Search;

The method also provides for insertion of new data strings or elements into the tree for searching. The insertion process proceeds in the same manner as any usual binary search tree when the data sets are disjoint or the new string is not an enclosure of any string which is already in the index tree. It should be apparent to one skilled in the art that a formal routine for this process can be accomplished using well known structures and algorithms. When the string to be added is an enclosure of any string in the index tree, the method ensures that enclosure are in a higher level than the strings contained in its data space.

Two procedures or functions of the parent invention may be used for adding an enclosure. In the first embodiment the procedure follows the search path and when it finds the first string which is contained in the new string, it inserts the new string in this place and makes the contained element a "child" of the inserted node. In the second embodiment, the search path is followed until the first contained node is determined. Then, the contained string is replaced with the prefix. Next, the replaced string is reinserted in the index tree. Replacing a node with a new element may result in the subtree not remaining sorted. The method must then sort the subtree by moving its data elements around the new inserted string. In the second and preferred embodiment, the insertion procedure is defined as follows:

```
/* tree is a pointer to the root of the index tree and str is a
   query string.*/
Insertion(tree, str)
    if tree=NIL, then,
        node←AllocateNode( );
    node←str;
    make tree parent of node;
    return;
    if str is an enclosure of tree(root) then;
        replace tree(root) with str;
        Insertion(tree,tree(root));
        if str<tree(root), then;
            Move(leftChild(tree), str);
        else
            Move(rightChild(tree), str);
        return;
    if str<tree(root), then;
        Insertion(leftChild(tree), str).
    else
        Insertion(rightChild(tree), str).
    end Insertion;
```

The AllocateNode function allocates a new node and the Move function recursively moves all data elements in the subtree to compare to the given query string. It should be noted that reinsertion of the replaced element does not need to start from the root of the index tree and it can be inserted in the subtree rooted in the replaced node.

Alternatively, to the standard binary tree, the parent invention provides an 'm_way' tree, which is a reduced height tree, more balanced tree, with more efficient search time. In this tree, no data element can be in a higher level than its enclosure. Nevertheless, this requires checking all the data elements in the tree node at each step instead of just checking few. An m_way can have at each internal node at most m−1 data elements or m branches. The number of data elements in the leaves of this tree do not need to be m and can be much more as a result of an internal node containing m memory addresses. All query processing or search procedures are the same as in a binary tree, except for checking all elements in each node, instead of just checking one data element.

The "dynamic prefix m_way tree" is similar to a B tree in general. This index tree satisfies the condition that no data element is in a higher level than its enclosure. Additionally, the tree is built bottom up like B tree.

The procedure for building an m_way tree is now applied to the data strings of FIG. 8 which again are from the binary alphabet {0,1}. The table contains 34 strings and the data elements longer than 5 bits have an abbreviation to make the final representation of the tree easier. This procedure assumes that each node, internal or leaf, has at most four data elements, implying each space is divided by five. The data elements are inserted into the tree randomly. Therefore, this procedure begins with an empty tree. Then, 01011, 1011010, 10110001 and 0100110 are added to the root node. Adding 110 causes overflow in the root and the node needs to be split. Since all data elements are disjoint, the median, 10110001, is chosen as the split point. The following shows the tree after splitting:

$$\swarrow 10110001 \searrow$$

$$(0100110, 01011) \quad (1011010, 110)$$

Later, 10110011, 1101110010, 00010 are inserted, with two data strings added to the right leaf node and the last one to the left. Inserting 1011001 causes overflow on the right leaf and it must be split. 1011001 is an enclosure of 10110011 and may be used as a split point. This element gives the worst splitting result since one space is empty and another full. Thus, because the other elements are disjoint, choosing the median, 1011010, gives better results and following is the tree obtained from splitting:

$$\swarrow 10110001 \downarrow 1011010 \searrow$$

$$(00010, 0100110, 01011) \ (1011001, 10110011) \ (110, 1101110010)$$

In the next step for building the tree, inserting 01 and 10001101 causes overflow in the left leaf. 01 is enclosure for 0100110 and 01011, and may be a split point. This is the only possible split point because 0100110 and 01011 cannot be placed in levels higher than 01 according to the prefix tree specification. Therefore, the building of the tree proceeds as follows:

$$\swarrow 01 \downarrow 10110001 \downarrow 1011010 \searrow$$

$$(00010, 0100110, 01011) \ (10001101) \ (1011001, 10110011) \ (110, 1101110010)$$

Adding 001, 10110111, 11101101, 100110100, 101011011, 101101110 and 101101000 causes no particular splitting procedure to be implemented. Next, 1011 is inserted. 1011 is an enclosure of 1011010 and 10110001 at the first level. 1011 cannot be in a lower level than its enclosed elements. Thus, the tree is built such that this data string is added to a higher level or at least to the same level of its enclosed elements (i.e., level one). 1011 is placed in level one in order to reduce the height and the search time of the tree. It should be noted that placing it between other data elements is not sufficient. The data strings in each subtree, and consequently in the tree itself, are sorted and divided with respect to the strings in the root of the subtrees. Each data element in the higher level divides the space in the lower levels.

1011 does not represent any space and strings in the lower level are not split based on it. In one embodiment, the parent method places 1011 in level one but marks it as an element which does not pop out from the splitting in lower levels. Then, the search and insertion procedure will ignore the space it represents. The later splitting of the node 1011 can go to the upper level. Alternatively, the preferred method replaces one of the enclosed strings of 1011 with 1011, the one which is closest in the sort ordering. Then, reinserting the enclosed element into the tree later.

1011010 is replaced with 1011 and then 1011010 is reinserted into the tree. Based on the definition of this method, 1011 is greater than 1011010. All of the elements in the left side of 1011010 will be smaller than 1011 and they must remain there. The data strings in the right side, which are all larger than 1011010 may not be larger than 1011. Thus, the data elements in the right side must be sorted and moved according to data string 1011. In this example, all elements are larger a nd stay in the ir original places. In general, the procedure needs to divide a space represented by a node based on a new prefix. Therefore, the tree is now built as shown:

↙ 01 ↓ 10110001 ↓ 1011010 ↓ 1011 ↘

(00010, 0001, D, 01011) (L, P, Q) (B, F, X) (S) (110, M, K)

Figures 8, 9:
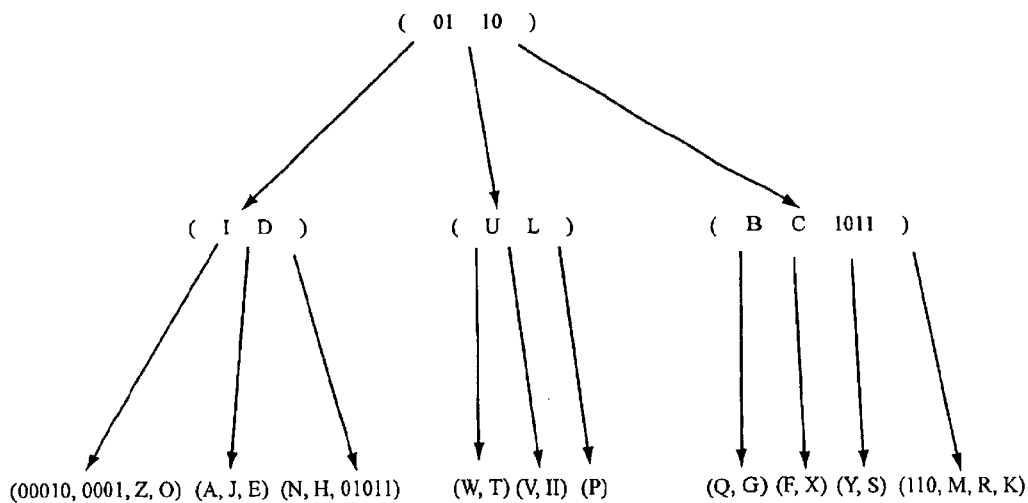
FIG. 8 is a set of data strings in the {0,1} alphabet.
FIG. 9 is a dynamic m_way prefix tree constructed according to the method of the parent invention for the data prefixes in FIG. 8.

FIG. 9 shows the final dynamic m_way tree structure for the elements of FIG. 8. It should be noted that the height of the tree is 3 and the search process is faster.

The parent invention also provides a method for building a dynamic m_way prefix tree for a set of data strings with different lengths.

When node splitting, the method must determine the spilt point in a node. In a B tree, the median element is chosen for splitting the space. In the dynamic m_way prefix tree, the split point may be selected in the following order for an overflow node:
1. If all strings in the node are disjoint, the median is selected as the spilt point;
2. If there is an enclosure which encloses all other data strings in the node, it is selected for splitting the tree node;
3. In all other cases, the data elements can be a combination of disjoint spaces and strings. In that case, an enclosure or a disjoint element which gives the best splitting result is chosen as the split point. The method must avoid taking elements in the left most or right most subtree as the split point, as this results in the worst splitting scheme (i.e., one node full and another empty).

The parent method also provides for space division when a data string is replaced by its enclosure in an internal node of a prefix tree. In this case, the data strings in a subtree are sorted and the data space is divided by the data elements in the root node of the subtree. According to the tree definition, all strings in the left subtree are smaller than the root and the elements in the right subtree are larger. When the root is replaced by another data element the method should check all elements in the subtree and move elements which violate this condition. The method then needs to divide the data space with respect to the new string in the root. The method must divide the subspace either in the left or right. If the new string is bigger than the replaced string in the root, all elements in the left subtree still will be smaller than the new string and will remain in their original place. Some data elements in the right subtree may be smaller and must be moved to the left. The method does this recursively from the top to the leaves. The following procedure for dividing a (sub)space with respect to a new string is provided (assuming the enclosure or the new string is bigger than the original one). The elements in the right subtree are checked for being smaller. Checking the left subtree is the same except the smaller sign (<) in the while condition must be replaced with the larger sign (>). The following space division procedure is provided:
/* node is a pointer to a node and str is the new split point. */
SpaceDiv(node, str, left,right)
  if node is NULL return.
  i←first str in node;
  while(i<str & i is not nil)
    delete i from right and add it to left
    i←next str in node;
  end while;
  SpaceDiv(i.left, str, newLeft,newRight),
  add newLeft to the end of left.
  add newRight to the beginning of right.
end SpaceDiv;

It should be noted that left, right, newLeft and newRight are the pointers to the nodes of the index tree which contain a list of strings. A pointer and a string are added in the same way to the lists pointed by left and right. Further, i.left gives the pointer in the left and the last pointer in the node when i is nil. It should be appreciated by one skilled in the art that this procedure is not required in the building process if strings with shorter lengths are inserted first.

The insertion procedure, used to build the dynamic m_way prefix tree, which uses the Split, SpaceDiv and NewNode functions to split a node if it is full, divides a space if an element is replaced by its enclosure, and allocates a new node if a node is full and is going to be split. RightChild and leftChild return the right and left pointers of a data element in an internal node. The insertion procedure may be defined as follows:
/* tree is a pointer to the root of the index tree. */
  Insertion(tree, str)
    if tree is leaf, then,
      if tree is full, then,
        node←NewNode( );
        Spilit(tree, node, str);
        insert str in the corresponding node, or tree.
      else
        insert str in tree.
      return;
    if str is enclosure of any element in the node pointed by tree, then, replace the closet contained element i in str with str;
      if (str>i) then;
        SpaceDiv(rightChild(str), str, left, right);
        Merge(leftChild(str),left);
      else
        SpaceDiv(leftChild(str), str, left, right);
        Merge(right, rightChild(str));
      insert i in tree
      return;
    i←first string in tree(node);
    while (i<str or no next element in tree(node))
      i←next string in tree;
    if str is greater than all elements (i is the last one), then;
      Insertion(rightChild(i), str)
    else
      Insertion(leftChild(i), str)
  end Insertion;

The SpaceDiv procedure is needed to divide the space according to the new root element.

The search procedure for the dynamic m_way prefix tree is similar to a B tree, except all data elements in each node are checked exhaustively. The procedures for finding the longest prefix matching, the smallest prefix matching and all prefixes of a query string are the same as the binary search tree. It should be noted that if there are two matching prefixes of a query string which are at two different levels, the one in the lower level has longer length.

The preferred procedure of the parent invention for searching for the longest prefix of a given query string in an m_way prefix tree (both static and dynamic m_way prefix trees) is as follows:

```
/* tree is a pointer to the root of the index tree and str is the
   query string.*/
Search(tree, str)
    if tree=NIL, return NULL;
    i←first element in tree(node).
        while(str<i&i is not nil) do;
            i←next element in tree(node).
            j←i;
        enddo;
        if i is not nil, then
            prefix←Search(leftChild(i), sir).
        else
            prefix←Search(rightChild(j), str).
        if prefix is NULL, then,
            prefix←the longest prefix in tree(Node) matching str.
return prefix;
```

In defining the above search procedure, the list of strings in each node must terminate with nil.

The method of the parent invention may be implemented in many different applications. One such application is the Internet. In this application a preferred device for performing the method is a router. The method may be implemented in the router P50 as shown in FIG. 1.

Figure 10:
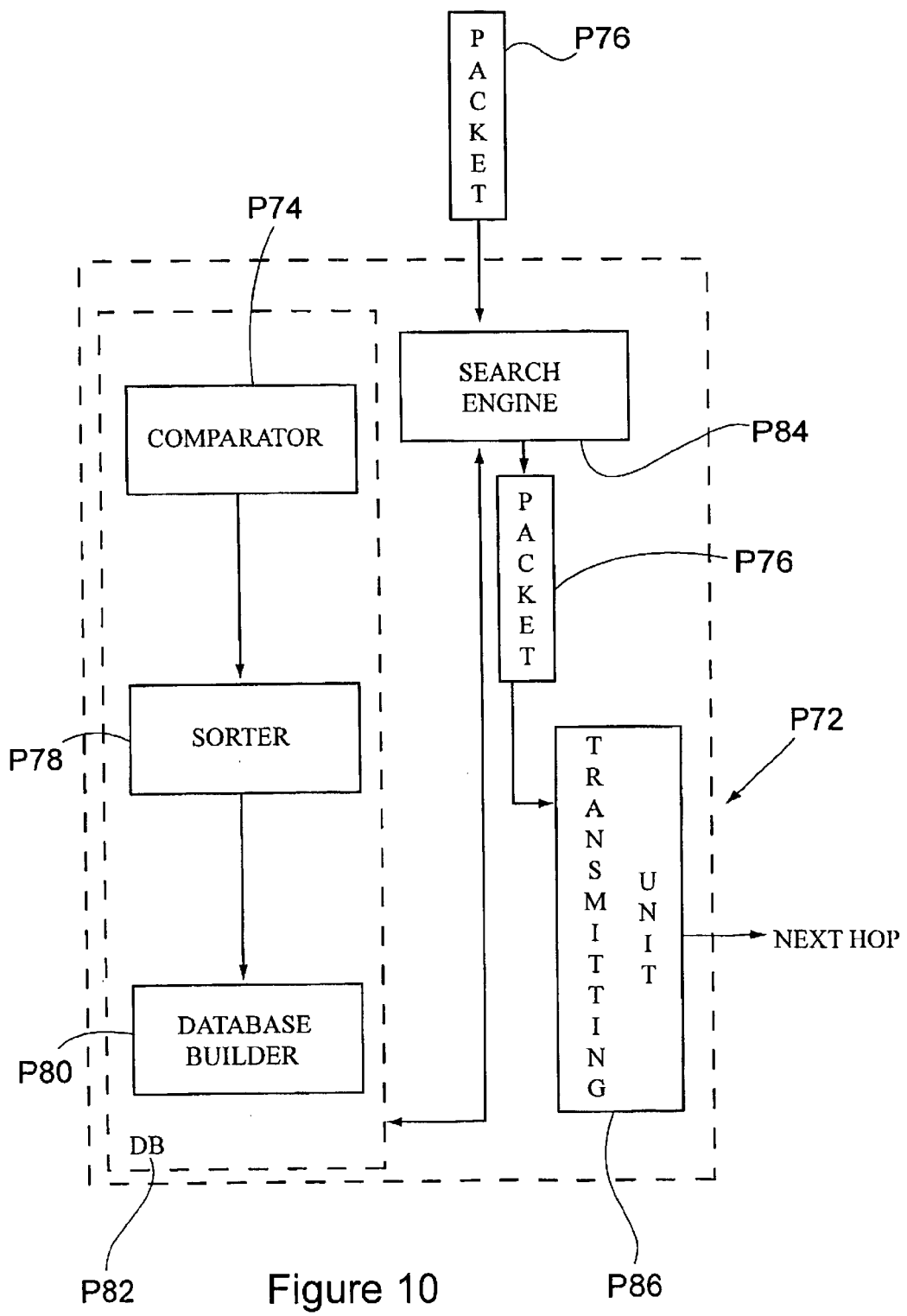
FIG. 10 is a schematic block diagram of a router constructed according to the principles of the parent invention.

A typical router is shown schematically in FIG. 10 and indicated generally by reference numeral P72. The router P72 for forwarding data packets based on the method of the parent invention, includes a comparator P74 that compares the value of the data strings. The data strings are then sorted by a sorter P78 based on the value of the data strings. The sorted data strings are organized in a tree structure (e.g., binary tree, static m_way tree or dynamic m_way tree) by a database builder P80 and stored in a database (DB) P82. Once stored in a tree structure format, data packets P76 sent to the router P72, are processed in a search engine P84, using the stored data, and the router P72 transmits the data packet P76 to the next hop using a transmitting unit P86. Therefore, in operation, the router P72 is able to quickly and efficiently determine the next hop or address to which the data packet P76 should be sent.

B: The Embodiments of the Present Invention:

Before describing the details of the present invention, it is helpful to explain the general framework of issues encountered in any n-dimensional (or multi-dimensional) indexing scheme generally, and packet classification in particular.

General Framework

Any high dimensional data can be modeled as a set of <$K_1, K_2, \ldots, K_n$, REF> topples. Each topple represents a data object and $K_1, K_2, \ldots$, are keys within the data objects. REF is a pointer to the data object itself, another table that contains the data object's information, or simply its other attributes. Data objects are indexed based on their keys. We call <$K_1, K_2, \ldots, K_n$> the index vector of the data object. If the keys provided by a query object match the keys of a specific data object, $K_1, K_2$, other information, such as a classification rule for the data object can be retrieved by following REF. When there is only one key, $K_1$, we have regular one dimensional indexing and the problem is much easier. This framework is general, and any n-dimensional indexing problem can be modeled based on it. For example, FIG. 12 shows the structure of a rule or filter for IP packet classification. Headers are different fields, or dimensions, of an IP packet. Examples of such dimensions are source and destination addresses, protocols or source and destination ports used to filter/classify the packet. The Comment/Action field specifies how the system should treat a given packet. If the information carried in a packet matches the header fields of a rule, the content of the Comment/Action field is applied to the packet. According to the general framework, each rule/filter is considered as a data object. The Comment/Action field might contain other information like QoS parameters, or it may be a pointer to another table containing this data. Generally, the number and type of fields used for indexing is application dependent. For instance, in packet classification, source and destination addresses, source and destination ports, type of protocol and TCP flags are usually used to classify packets. The methods of the present invention are independent of type and the number of data dimensions, and it is flexible enough to apply to any multidimensional data.

Types of Matching

Types of matching are application dependent. The match type also depends on the search dimensions. In most applications, especially in packet classification, the following types of matching are encountered.

1. Exact matching: This type of matching is encountered in almost every application. In general, whenever the search key needs to exactly match the index key or data object in the database, one is dealing with an exact match query. Examples of this type of matching are enormous. For example, spell checking or protocol field matching in an IP packet typically use exact matching.

2. Range matching: In this type of matching, a user is interested in checking whether a data object's key or data is in a range of values rather than exactly matching a value. This type of matching covers a wide range of applications from ordinary range matching, like finding all employees from 40 to 50 years old, to image applications. Sometimes, this type of matching expresses aggregation in applying some rules. For instance, in the IP packet classification, ports are usually expressed in ranges to apply aggregation. Other queries such as similarity match queries may be transferred into range queries. Range matching gains more and more importance every day as image and similarity matching applications become more prevalent.

3. Prefix matching: This is the most difficult type of matching and fortunately covers a limited range of applications. Whenever the query string is a prefix of the data string or vice versa, one is dealing with prefix matching. A well-known application of prefix matching is IP packet forwarding or routing, which is based on the longest prefix matching the packet destination address. This problem is faced in packet classification when matching a packet source and destination address with the rules' source and destination addresses expressed in terms of prefixes. However, in packet classification, we are interested in all matching prefixes not just the longest matching prefix. Another well-known application of prefix matching is general pattern matching in text processing.

4. Special character matching: Some wildcard characters like '*' may match everything. An instance of this type of matching is the UNIX regular pattern expression. In packet classification, some fields may be specified by '*' implying the field matches any entry. This type of matching needs special care; otherwise, the search will be very costly. We only consider '*' special character matching in our methods.

Design Philosophy

Many n-dimensional (or multi-dimensional) indexing schemes such as K-B-tree, R trees, etc., have been proposed by the database community. All those methods while working well in some applications suffer from the following shortcomings:

High dimensionality: Almost all the proposed n-dimensional data structures suffer from a problem which is usually referred to as high dimensionality. These data structures keep bounding boxes in the internal nodes to divide the data space. Keeping bounding boxes is very costly when dealing with a high number of dimensions, fox example, more than 10 dimensions. This limits the branching factor in the internal nodes. This problem is so serious such that the literature reports that after 20 dimensions, the search performance is practically linear while requiring a huge space for indexing. The present invention as explained later completely avoids high dimensionality.

High cut cost: High dimensional indexing methods use the general philosophy of 'divide and conquer'. They divide the data space whenever the amount of data in the space passes a threshold. The space is cut or divided based on a dimension that gives the best splitting results. Unfortunately, cuts in the higher level of the index tree cut the node or space in the lower level and vice versa. This technique is very costly for inserting a new data object into dynamic data structures such as K-B-tree and R trees. Since the present invention always classifies data objects on the basis of one dimension in the proposed index trees, this problem is completely avoided.

Prefix matching: To the knowledge of the inventors herein, none of the conventional index structures are integrated well with prefix matching when the data objects have a high number of dimensions. The methods using recursive indexing based on the different dimensions are not efficient in search time and space usage. The present invention integrates prefix matching with other types of matching in a multi-dimensional indexing scheme.

The present invention removes all these shortcomings. It is assumed that all search keys have been already specified. This is the case in most applications, especially in the routing/filtering of IP packets, since the packet carries all headers or keys. We do not consider searches based on only one specific field even though it can be defined by specifying other keys as '*'. This type of search can get costly for some keys. The backbone of the present invention is the DMP-tree disclosed by the inventors herein in the parent U.S. patent application having a Ser. No. 09/474,452, entitled "Method and Apparatus for Matching Strings of Different Lengths," the disclosure of which is reproduced above and hereby incorporated by reference. Therefore, before going to the technical details of the present invention, we review the theoretical background of the DMP-tree structure.

Background and Basic Issues

Tree structures keep the data elements sorted. In order to apply any tree structure to a data set, it is essential to define a mechanism to sort them. Both of our methods use the following definition to sort and compare strings of different lengths from the above-disclosed and referenced parent application. It is worth noting that we assume the characters in the alphabet are ordered.

The methods disclosed in the parent application perform the compare and sort function based on the following definition: if there are two strings $A=a_1a_2 \ldots a_n$ and $B=b_1b_2 \ldots b_m$ where $a_i$ and $b_j$ are characters of alphabet $\Sigma$ and there is a checkpoint character $\perp$ which belongs to $\Sigma$, then, if n=m, two strings have the same length, the values of A and B are compared to each other based on the order of characters in $\Sigma$, and if n≠m (assume n<m), then, the two substrings $a_1a_2 \ldots a_n$ and $b_1b_2 \ldots b_n$ are compared to each other. The substring with the bigger (smaller) value is considered bigger (smaller) if two substrings are not equal. If $a_1a_2 \ldots a_n$ and $b_1b_2 \ldots b_n$ are equal, then, the $(n+1)^{th}$ character of the longer string is compared to the checkpoint character. B≦A if $b_{n+1}$th is equal or before the check point character $\perp$ in the ordering of the characters in $\Sigma$, and B>A otherwise.

The check point character ($\perp$) is preferably selected in such a way that the probability of any character(s) being greater than the checkpoint character is about equal to the probability of any character(s) being less than the checkpoint character. For example, in the English alphabet, assuming that the probability of a character in the range A–M is about equal to the probability of a character in the range N–Z, M is selected as the checkpoint character ($\perp$).

According to the above-described comparing method, BOAT is smaller than GOAT and SAD is bigger than BALLOON. CAT is bigger than CATEGORY because the fourth character in CATEGORY, E, is smaller than M. In the alphabet {0,1}, we select the checkpoint character $\perp$ as 0. When applying the method of the invention, 1101 is greater than 1011 and smaller than 11101, and 1011 is greater than 101101.

We need two more definitions before technically explaining the indexing method. If there are two strings $A=a_1a_2 \ldots a_n$ and $b_1b_2 \ldots b_m$ where $a_i$ and $b_j$ are characters of alphabet $\Sigma$, then, A and B match if n=m and the two strings are identical, or (assuming m>n), two $a_1a_2 \ldots a_n$ and $b_1b_2 \ldots b_n$ substrings are the same. Otherwise, A and B are not matching. We define two data strings as disjoint if A and B are not a prefix (or substring) of each other and further define a string S as an enclosure if there exists at least one data string such that S is a prefix of that string. For example, in the character set defined by the English language, BAT and PHONE are disjoint, but DATE is an enclosure of DATED and DATELINE. As another example, in the {0,1} character set, 1011 is an enclosure of 1011001, 1011010. An enclosure represents its data space as a point in the data set. For instance, all data strings included in the range of 1011, such as 1011001, 1011010, and 1011 itself, are considered as a point represented by 1011. A data element may be included in an enclosure or be disjoint with all other elements.

DMP-Tree

A DMP-Tree (Dynamic M_way Prefix tree) has been disclosed by the inventors herein in the above-referenced parent application as a tool to compare and match strings of different length in general and prefixes in particular. A DMP-tree is a superset of B-tree, balanced tree, with the following distinctions:

No data element can be in a higher level than its enclosure in the index tree structure.

A DMP-tree does not guarantee minimum node utilization.

It is not possible to guarantee that the final tree is balanced.

The first property differentiates the DMP-tree from a B-tree. Indeed, when all data elements are disjoint, a DMP-tree is exactly the same as a B-tree. This property enforces some specific node splitting policies that affect the whole structure of the tree. The second and third properties are direct result of node splitting policy. Experimental results show these properties become less important when the branching factor in the internal nodes is big and the data set is large.

The DMP-tree has been proposed to handle one dimensional data. The hottest application of this data structure is forwarding IP packets in routers or forwarding engines based on the destination addresses of the packets. Routers must find the longest network address, or IP prefix, matching a packet destination address and forward packets to the corresponding next hop in the routing table. Therefore, again, prefix matching is encountered, and in general, matching strings of different length when the strings may be prefixes of each other. Nevertheless, the matching is still in one dimension. In some applications like IP packet classification, we are dealing again with prefix matching, but in two-dimensional space, packet source and destination addresses. The DMP-tree must be modified to index and retrieve data in such multiple dimensions. Since the DMP-tree is superset of B-tree, it can handle exact and range match queries as well as prefix matching queries. We will explain how range match queries can be handled in our schemes. Handling all these queries makes the index construction and search processes complicated. In some applications these procedures may be simplified if not all of those types of matching are needed. For instance, if an application has only range and exact match queries, the prefix matching algorithm can be omitted from the building and searching processes.

General Principles

Some general design principles are followed in the present invention. These principles are as follows:

data elements covering ranges are represented by lines in the dataspace. If a dataspace is divided due to an overflow, a line representing a data element may be split into two. In this case, the data element is inserted into both spaces. Then, a data element may exist in different nodes with different attribute values of the same type. FIG. 11 illustrates a data set and its corresponding representation in the tree after splitting the space. As can be seen in FIG. 11(a), 01, 02, 03, 04, 05, 06, and 07 represent data objects. The line denoted with a 1024 represents a split value for these data objects. Data objects falling within a range less than the split value are situated to the left of the split value. Data objects falling within a range greater than the split value are situated to the right of the split value. The split value is chosen as an indexing point that enables a quick search for one of the data objects 01–07 that match a query object. FIG. 11(b) depicts an example of how the data objects can be indexed. Node 108 comprises 4 spaces. Space 110 is occupied by a pointer pointing to subtree 100. Space 112 is occupied by the split value 1024. Space 114 is occupied by a pointer pointing to subtree 102. Lastly, space 116 is occupied by a pointer pointing to subtree 106. All data objects falling within a range less than the split value have been placed into subtree 100. All data objects having a range value equal to the split value 1024 have been placed into a subtree 102. All data objects falling within a range greater than the split value have been placed into subtree 106. If one wishes to search for a data object having a range value from 1026 to 1030, a scan of the node will index the search directly to subtree 106 because the lower limit of the query range (1026) is greater than the split value. This technique prevents the search from wasting time while scanning data objects having values less than or equal to the split value. Another approach is to transfer the data objects into prefixes. The main problem with this method is getting more than one prefix for a range. For instance, for the range $[0, 2^k]$, we will need at most k prefixes to represent the range in the data set. This implies duplicating objects in different places. We believe this duplication is more costly than the method depicted in FIG. 1(b). It is recommended that the keys specifying ranges be the last dimensions to split the data space. Wildcard '*' matches all data objects and it is considered smaller than everything. In node splitting, if there is '*' in the node, it is considered as the split point. Therefore, it is always pushed to the higher levels. This guarantees that the search process will never miss objects having '*' as keys as will be explained latter.

The search space is always divided based on one dimension. If too many data objects are mapped into one point under the split dimension (such as when the number of data objects in a subtree exceeds that subtree's capacity), the search and building process changes the split dimension and divides the data space based on the new split dimension. Therefore, the index trees keep ranges of the split dimension in the internal nodes instead of keeping bounding boxes. This property makes the index trees of the present invention scalable to a high dimension and avoids the high dimensionality problem discussed above. Since the data space is divided based only on one dimension at a time, we also avoid the high cost of cuts in the upper levels. Indeed, any cut in the higher levels, does not affect lower levels. This may make the search procedure costly when not all dimensions of the query object have been specified. However, in most applications such as packet classification this is not the case.

Basically, the index trees of the present invention are multi-level integrated tree structures that have been constructed based on the different keys of data objects. The first level of the index tree is built based on the first dimension. If too many data objects are mapped to one point such that dividing the data objects is impossible based on that dimension (meaning that the data objects cannot be identifiably separated on the basis of that dimension), the leaf node or data space is divided based on the second dimension. An example will help illustrate this concept, if data objects D1, D2, D3, and D4 have been placed into a subtree that has a predetermined capacity for three data objects, an overflow exists, and the data objects need to be split. If each of the keys associated with the dimension under which the data objects were placed into the excessively-filled subtree are 145.* for those data objects, then the data objects share the same key. These data objects cannot be identifiably separated based on that dimension. In such situations, to identifiably separate the data objects, the dimension needs to be changed to one under which keys in the data objects can be identifiably separated. However, if the pertinent key for D1 is 143.*, the pertinent key for D2 is 144.*, and the pertinent keys for D3 and D4 are 145.*. In such case, the dimension does not need to be changed to perform the split. The same process is applied recursively to the third, fourth, etc., until the last dimension.

It would be best if the dividing process starts from a key or a dimension which is the most discriminative. The keys and their corresponding matching types are kept in a table. We refer to this table as the split table. FIG. 13 illustrates a sample of a split table for IP packet classification. As can be seen, a match type (column 2) is associated with each split dimension (column 1) of the IP packet. The splitting process divides the space with respect to the key in the top of the split table first. When it is impossible to split the space in an excessively-filled node, the splitting process switches to the second dimension in the split table and so on. The split table must be populated by the user before building the index trees. The idea of the split table makes the present invention very flexible in that the table can be adjusted to properly match the application under which the present invention is used.

1. First Embodiment of the Present Invention: "Dividing by Three"

Based on the general framework discussed above, any multidimensional index method can be considered as indexing a set of data objects according to a plurality of dimensions instead of one. This is an old problem in the database community. One of the first solutions proposed by the community was to build different indexes based on each dimension or key. This solution is extremely costly besides having inconsistency in updates. Some multidimensional access methods such as R-trees, K-D-tree and K-D-B-trees have been proposed. These data structures essentially divide the data space into bounding boxes. The main problems with these methods are high dimensionality and high cut cost as explained previously. The first question in designing was why not index data objects based on only one dimension? Conventional wisdom discourages indexing data objects on a single dimension because when indexing data objects on a single dimension, none of the dimensions may uniquely identify the data objects. This is the first condition in building any one dimensional index structure; all data objects need to be uniquely identifiable. However, the present invention allows data objects to be indexed on only one dimension, but the tree structure as a whole uses different dimensions to index all of the data objects, thereby ensuring that all data objects can be uniquely identified.

Regarding this implementation, there is no problem in indexing data objects that are uniquely identified by the key currently used for building the index tree. The problem is encountered when different data objects share the same value for the indexing dimension and therefore cannot be identifiably separated. Based on the conventional tree structure, any value in an internal root node divides the data space in the subtree rooted in it into two subspaces. All of the values in the left subtree are smaller than or equal to the split value in the root node. And all data elements in the right subtree are bigger than the split value in the root node. The data space in the left and right subtree are also divided based on new split values if the number of the data elements in those subtrees exceeds the subtree's capacity. This process is applied recursively to the lower levels. Let us assume that all of the data objects in the left subtree are the same as the split value in the node and their number is large and cannot fit in a single node. Then, the node must be split. However, all of the elements are like a point, and we do not know how to split a point. The result is a problem faced in building the index tree when the data objects are equal to the split point. This is the key point in both embodiments of the index tree of the present invention. Our first solution to this problem is to divide the data space into 3 subspaces instead of 2 when node splitting. Then, we place the smaller values into the left subtree and bigger values into the right subtree. Those data elements which are equal to the split value are put in the center subtree. It must be noted that the terms "left", "right", and "center" when discussing the subtrees are chosen for the sake of clarity and ease of understanding when drawing a representation of the index tree. These terms are not necessarily meant to imply an actual physical positional relationship with each other. We do not have problems with elements in the left and right subtrees for indexing and searching. However, the data elements in the center subtree must be handled with special care. If the number of elements in the center subtree exceeds the subtree's capacity is split based on the next field or dimension in the split table. Before going to the details of the building and searching of the index tree, it would be better to illustrate the idea with an example.

FIG. 14 depicts an example of a root node that is used in the "divide by three" index tree of the present invention. As can be seen, the "smaller" space is occupied by a pointer that points to a subtree reserved for data objects having a key smaller than (less than) the split value seen in the second space of the root node. The "equal" space is occupied by a pointer that points to a subtree reserved for data objects having a key equal to the split value. The "bigger" space is occupied by a pointer pointing to a subtree reserved for data objects having a key bigger than (greater than) the split value. This node may have more than one split value if the data objects in the subtrees need to be split and those data objects can be identifiably separated under the split dimension of the root node. In such a case the root node would be altered by replacing the space occupied by a pointer pointing to an excessively-filled subtree with another split value and pointers pointing to the newly-created subtrees.

EXAMPLE 1

FIG. 30 shows a table of a set of rules for classifying and filtering IP packets in routers and firewalls. The indexing dimensions 200, 202, 204, 206, and 208 are destination and source addresses, destination and source ports, and protocol respectively. Each rule in the table has a key for each dimension. For example, keys 210, 212, 214, 216, 218, 220, 222, 224, 226, 228, and 230 are the keys in each packet associated with dimension 200 (Destination Address). All of this information is carried in each IP packet and is extracted by an IP packet parser before forwarding the packet. The Comment field 232 specifies what the system must do to a packet matching the corresponding row. We are dealing with three types of matching in this example. The source and destination fields are specified as prefixes and matched against the packet source or destination addresses. The protocol field determines the packet initiating protocol. This is usually matched against exact values such as TCP or UDP. Finally, the source and destination port fields are usually specified in the aggregate format as ranges of values acceptable in the TCP/IP protocols. Therefore, we have prefix, exact and range matching. Furthermore, some fields are specified by '*' which makes the example more complicated. We use the split dimensions for each match type as shown in the split table of FIG. 13. Thus, the rules are indexed first based on the destination address, then, source address and so on. A packet may match different rules and, there must be a way to resolve the conflict. The table of FIG. 30 has a column 234 identified as priority. This column says the rule with higher priority must be used in case of conflict. If two matching rules have the same priority, the first matching rule in the table prevails.

We assume four branches in the split nodes; so, each root node can accommodate at most three rules (data objects). For the sake of simplicity, it is assumed that leaves also can contain at most three rules. However, it must be noted that the capacity of the subtrees in the present invention can be virtually any value. While a capacity of 3 is convenient when explaining the invention, in real applications, this capacity can be predetermined by a user to match his indexing needs. For example, a capacity for 10 or 16 data objects can be used. First, like any dynamic tree, the index tree is empty. The rules are inserted randomly. Let us assume R6, R10 and R2 are inserted into a leaf node of the index tree. Since the leaf node can contain three rules, we will not face any problem. Inserting R5 causes overflow in the leaf node as the leaf node is now filled beyond its stated capacity of three. The leaf node must be split based on the first dimension in the split table, which is the destination address. The destination address of R5 is '*' and whenever there is '*' in the node, it is the split value. Unfortunately, this does not give a good split since the left subtree is empty and the equal subtree only contains one element, while the right subtree is full. FIG. 15 shows the index tree after inserting R5 and splitting in the leaf node.

As can be seen, a split node (or root node) 130 has been created with a space 138 occupied a pointer pointing to subtree 132 (which is empty), a space 140 occupied by the split value (which is "*"), a space 142 occupied by a pointer pointing to subtree 134 (occupied by R5), and a space 144 occupied by a pointer pointing to subtree 136 (occupied by R6, R10, and R2).

Inserting R7 causes overflow in the rightmost leaf of the tree. Based on the DMP-tree property, 145.134 is the split value since it is an enclosure of 145.134.56.125 which is the destination address of R7. The result of the splitting is shown in FIG. 16. As can be seen in FIG. 16, another root node 146 has been created within root node 130, to form a destination address-dimensioned root node with two split values. Space 148 is occupied by a pointer to subtree 158 which is reserved for the split data objects having a destination address key less than the split value 150. This subtree is further reserved for data objects having a destination address key greater than the split value 140 (split values 140 and 150 are said to share this subtree). Space 152 is occupied by a pointer pointing to subtree 156 which is reserved for split data objects having a destination address key equal to the split value 150. Space 154 is occupied by a pointer pointing to subtree 154 reserved for the split data objects having a destination address key greater than split value 150. The split data objects (R7, R6, R10 and R2) are then placed into the appropriate subtree.

Figure 17:
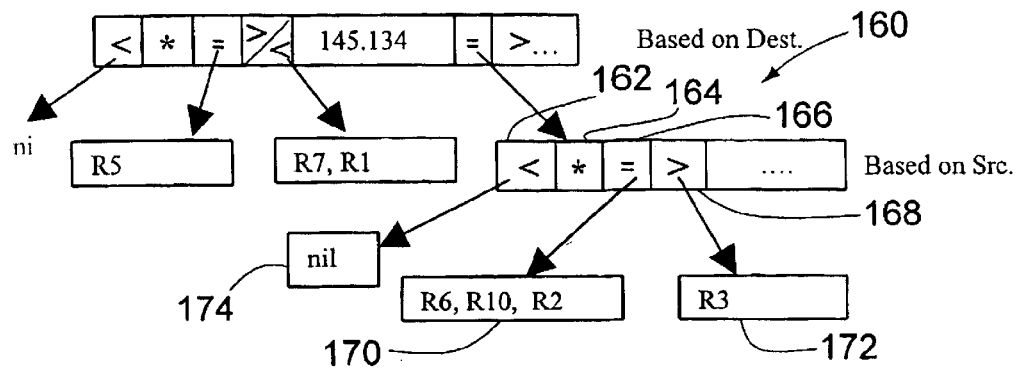
FIG. 17 is a further illustration of the index tree of example 1 as more data objects have been indexed and a split has occurred on a second dimension.

Inserting R1 causes no trouble. R1 is added to the leaf node containing R7. Then, R3 is inserted. R3's destination address is 145.134 and it must be added to the rightmost leaf beside R6, R10 and R2. However, this leaf node is full and cannot accommodate a new data object. The leaf node must be split, but, all data objects therein have the same value. This is the situation when more than the data objects in an excessively-filled leaf node cannot be identifiably separated on the basis of the dimension of the root node pointing to the excessively-filled subtree. In such cases, the split dimension is changed to the next dimension in the split table (which is the source address). This dimension is the starting point of a new tree in the lower level. FIG. 17 shows the index structure after the second split. The split dimensions are also specified in the figure. The nil addresses have been identified by η in the address fields. As can be seen in FIG. 17, a new root node 160 has been created to accommodate the data objects in subtree 156 that became excessively-filled when R3 was added. Root node 160 indexes data objects R6, R10, R2, and R3 on the basis of a new split dimension—the source address. Root note 160 is configured with pointers and split values (162, 164, 166, and 168) just as the previously-described root notes, with the exception that the split value is a value within the new split dimension. The data objects R6, R10, R2 and R3 are split based on this new split dimension and placed into the appropriate subtrees 170, 172, and 174. In this example, R6, R10, R2 and R3 are being split based upon their source address keys which are *(R6), *(R10), *(R2), and 128.241*(R$_3$). The split value for node 160 is chosen to be *. Because * is defined as always being the smallest key, the subtree 174 that is reserved for data objects with source address keys smaller than * is left empty. Data objects R6, R10, and R2, which have * as the source address key are placed into subtree 170 which is reserved for data objects with a source address key equal to the split value 164. Data object R3, which as a source address key of 128.241* is placed into subtree 172 which is reserved for data objects with source address keys larger than split value 164.

Figure 18:
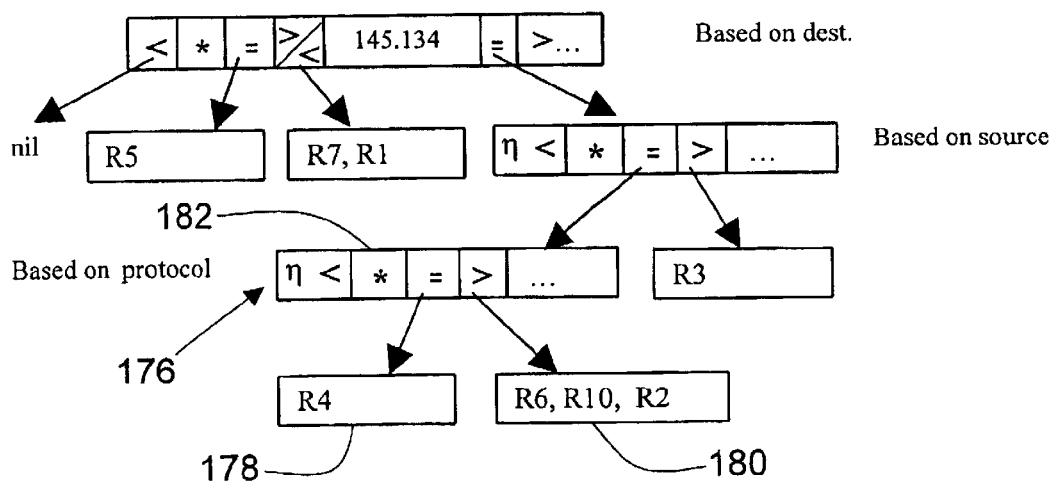
FIG. 18 is a further illustration of the index tree of example 1 as more data objects have been indexed and a split has occurred on a third dimension.
Figure 19:
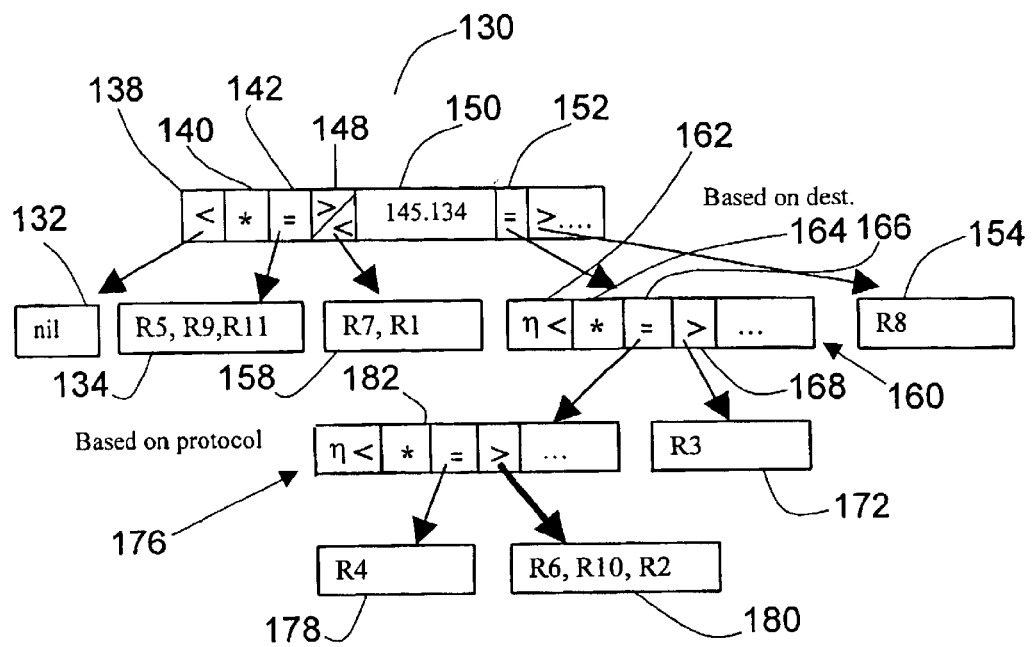
FIG. 19 is an illustration of the index tree of example 1 after all data objects presented for placement have been indexed.

Later, R4 is inserted into the index tree. It must be added in the leaf node beside R6, R10 and R2. However, this leaf node cannot accommodate the new data object and it must be split. As each of these data objects in the excessively-filled leaf node (R6, R10, R2, R4) have the same source address key, we cannot split those data objects based on the source address dimension (or split dimension). Therefore, the split dimension is switched to the next element in the split table. The next split dimension is protocol. The protocol field of R4 is '*' and based on the present invention's index tree property, it must be the split value. In this way, '*' always is pushed to the root node of each tree in any level. The search process therefore will not fail to visit '*' and will never miss it. FIG. 18 shows the result after a split based on the protocol dimension. As can be seen in FIG. 18, a new split node 176 has been created in place of subtree 170. This split node indexes data objects on the protocol dimension and has a split value 182 of "*". Subtrees 178 and 180 have space reserved for the data objects in the excessively-filled subtree 170 that have protocol keys equal to the split value 182 (subtree 178) and are greater than the split value 182 (subtree 180). The lesser subtree will be empty as the source key "*" is by definition the smallest possible value. For the sake of clarity, this condition is indicated by the "η" notation in split node 176. Inserting the rest of the rules, R11, R9 and R8 causes no new splits. The final index tree is shown in FIG. 19. R8 which has a destination address key of 225.* can be placed into subtree 154 which is reserved for data objects having destination address keys larger than 145.134*. R9 which has a destination address key of * can be placed into subtree 134 which is reserved for data objects having destination address keys equal to*. R11 also has a destination address key of * and can similarly be placed into subtree 134.

The final product of these above-described steps of indexing data objects into an appropriate subtree is a multi-dimensional index tree that uses split values within one dimension of the data object to index that data object into one of three subtrees associated with each split value. On each level, data objects are classified solely on one dimension. However, if too many data objects sharing the same key within that dimension are indexed into the same subtree, then a second level is created to index those data objects in the excessively-filled subtree on the basis of a different dimension. Within this new dimension, the data objects are split and indexed according to keys associated with the new split dimension. The split dimension can be repetitively changed to a new split dimension as more data objects are indexed and those data objects being mapping to a single point.

Let us assume that there is a packet with destination and source addresses 145.134.56.127 and 219.156.72.134 and source and destination ports are both 80 and it is a UDP packet. The index vector of the packet will be <145.134.56.127, 219.156.72.134, 80, 80, UDP>. We want to determine with which rules match the packet and what the system will do with this packet. We have to search the rule index tree to find all rules matching the packet and then, choose the one with highest priority. For the prefixes, we are interested in all matching prefixes, not just the longest matching one. The search starts from the root (the split node associated with the first split dimension) in FIG. 19. The split dimension for root node 130 is the destination address.

The first split value in the root node is '*' which matches everything, including this address. All elements in the equal subtree 134 can potentially match this packet within this subtree. The second dimension, source address, of R5 and R9 do not match the source address of the packet. The only matching rule here is R11. The second split value in the root node 130 is 145.134, which matches the destination address of the packet. According to the prefix comparison definition discussed previously, the destination address of the packet, 145.134.56.127, is smaller than 145.134. Then the search has to follow the left and equal branches in order to find the matching rules. Following the left branch into subtree 158 does not give any result since the source addresses of R1 and R7 do not match the source address of the packet. The search then follows the equal branch. Since the pointer points to split node 160, and not a subtree, we have to change the split dimension to the next one, source address. The split node 160 has only one split value, '*', and the data objects in the subtrees of the equal and rightmost branches may match the packet. First, the search follows the equal branch. Again, we have to change the split dimension to the next dimension in the split table because the pointer points to split node 176 and not a subtree, which is protocol. Here, the search encounters start of another tree based on the protocol dimension. Again, there is the same story, division has been performed based on '*'. The search process has to follow the equal branch first and the right branch next. In the equal subtree 178, there is a leaf node meaning that this is the bottom of the tree. The leaf node contains one rule, R4, which does not match the packet. Following the right (branch from split node 176 also does not give any result since none of R6, R10 and R2 matches the packet. Finally, the search comes to the upper level split node 160 and follows the rightmost branch to subtree 172 and compares the packet against R3. R3 also does not match the packet. The only matching rule is R11 and the packet is dropped (in accordance with the rule specified for R11 in FIG. 30).

Discrimination Ratio

An efficiency problem exists with the previous example in matching a packet with the index vector <145.134.56.127, 219.156.72.134, 80, 80, UDP> against the index tree because the search process compares the packet with the most of the rules. Even though the search for packets with destination addresses which do not match with 145.134 will be faster, we can do a better job for this example. There are two other reasons for the poor search performance of this example. The search has to compare the packet with all data objects in a leaf node to find out if there are any matching data objects. For an index tree with huge amounts of data this is not a problem. Generally, the number of data objects in a leaf node is limited and can be handled in an efficient way. Indeed, all tree structures keeping more than one data object in leaves have the same problem. However, in this example it shows itself specifically since we are dealing with small set of rules (11), and a leaf node can contain 3 of them (by our capacity which is set to 3 purely for the purposes of explanation), which is relatively a large proportion of the whole. Another problem is mapping many rules to one point based on the destination address. The destination address is not a good starting point for this specific example. To avoid this inefficiency, we define a discrimination ratio for each dimension in the split table as follows.

$$\text{disc. ratio} = \frac{\text{No. of unique keys within dimension}}{\text{No. of total data objects}}$$

Figure 20:
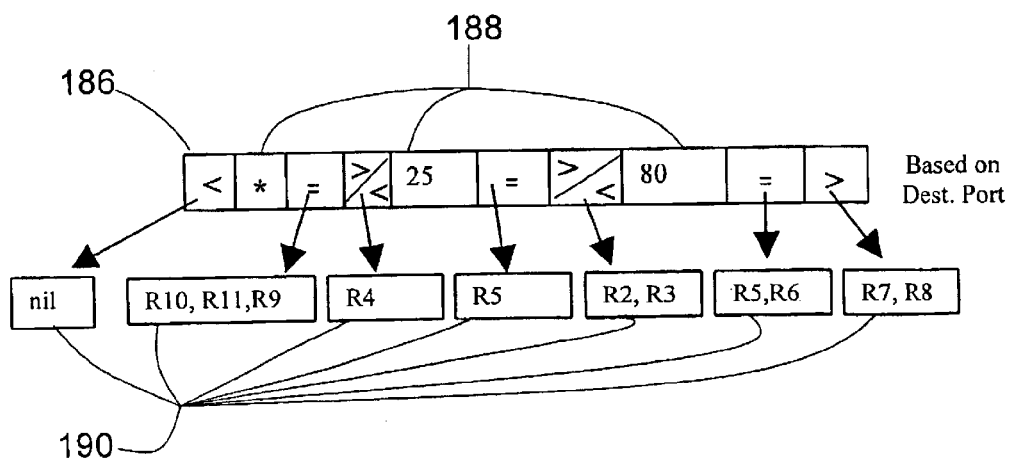
FIG. 20 is an illustration of the index tree of example 1 after all data objects presented for placement have been indexed, and the split dimensions are used in accordance with their discrimination ratios.

Applying this formula for the keys of FIG. 30 gives, 0.45 (5/11) for the destination address, 0.54 (6/11) for source address, and 0.63 (7/11), 0.36 (4/11) and 0.36 (4/11) for the destination port, source port and protocol respectively. We can sort these ratios and start indexing from the dimension with the largest discrimination value first, then with the dimension having the next largest discrimination value and so on. Building the index tree based on the new order of dimensions with the same insertion order for the data objects in example 1 yields another index tree shown in FIG. 20. Search on this tree for the matching rules with the packet in FIG. 30 is much faster and only needs to check two leaves. As can be seen, FIG. 20 discloses an index tree with a split node 186 that has three split values 188. Split node 186 indexes the data objects on the basis of those data object's destination port keys. Subtrees 190 are filled with the appropriate data objects.

The Search Procedure

Now, the formal search procedure for the index tree of the present invention will be discussed. We must define a few terms before formally defining the search procedure. The split dimension is the dimension under which the data space under consideration or the split node under check has been split. The search key is the key of the data object that the search uses to locate the object in the index tree. Obviously, the split dimension must correspond with the proper key in any stage of the search. Nevertheless, we separate them for the sake of clarity in defining the algorithms. For prefix matching, we consider finding all matching prefixes with the search key. If the search wants to find the longest prefix matching object, the procedure will be slightly different. Such a procedure is in a recursive format. Implementing it in a procedural form is straightforward.
Search Procedure
Step 0: If the index structure is empty, return Null.
Step 1: /*Initialization. */
    If this is the first call, then, do
        Let the split dimension be the first element in the split table.
        Let the search key be the first key of the search object.
Step 2: /*It is a leaf node. Start searching. */
    If the node under search is leaf then do;
        If the matching type is
        EXACT: Compare the search key to the corresponding keys of the objects in the leaf until finding the one which is greater than the search key. Report the object whose corresponding keys are equal to the search key.
        RANGE: Compare the search key to the corresponding keys of the objects in the leaf until to find the one which is greater than the search key. Report the objects whose corresponding keys range contain the search key.
        PREFIX: Report all objects whose corresponding keys are prefixes of the search key.
Step 3: /* It is an internal node Start searching. */
    If the node under search is an internal node then do;
        If the search came to this point from an equal branch in the upper level, let the split dimension be the next element in the split table and the search key be the field of the search object that corresponds to the split dimension.

If the first value in the node is '*', apply Search
  Procedure to the subtree in the equal branch.
If the matching type is
EXACT: Compare the search key to the values in the
  node until finding the one which is greater than the
  search key.
  If a value is equal to the search key, apply Search
    Procedure to the subtree in the equal branch of that
    value.
  Otherwise, apply Search Procedure to the left subtree
    of the first value, which is greater than search key.
    If no value was greater than the search key, apply
    Search Procedure to the last right subtree in the
    node.
RANGE: Compare the search key to the values in the
  node until the one who is greater than the search key.
  If a value is equal to the search key, apply Search
    Procedure to the subtree in the equal branch of that
    value.
  Otherwise, apply Search Procedure to the left subtree
    of the first value, which is greater than search key.
PREFIX: Assume P is the set of values (prefixes)
  matching the search key in the node.
  For any K∈P, do;
    Apply Search Procedure to the subtree in the
      equal branch of K.
    If the search key (prefix) is smaller than K,
      Apply Search Procedure to the left subtree of
        K.
    Else
      Apply Search Procedure to the right subtree of
        K.
End of Search The search procedure tries to find all matching data objects in accordance with the specified match type. In some applications, like packet filtering, the procedure must find a unique object or rule in order to avoid conflict among applying rules. In this case, each object/rule is assigned a priority and selection is done based on priorities among matching rules.

Building the Index Tree

Building the index tree is an essential part of the present invention. The index tree of the present invention is dynamic and built bottom up. First, the index tree is empty. Then, the data objects are inserted one by one into the index tree. Objects are inserted into the leaf nodes (which are interchangeably referred to as subtrees). If a leaf node or subtree overflows, it is split and the data objects in the leaf node or subtree are distributed between the resulting subtrees. The split value for the data objects being split is inserted into the split node pointing to the excessively-filled leaf node/subtree. The procedure is applied from the bottom up to the root. Thus, the index tree grows from the top not the bottom. Therefore, the first step in defining the tree building process is to identify the location of the data object. Then, we have to deal with node splitting. Later, we discuss the object insertion process.

Finding an Object Location

Finding an object location is almost the same as searching for a matching data object. However, there are a few basic differences. The insertion location for a data object is always unique, but there may be many data objects matching the search objects. The "get location" procedure is also faster than the search procedure since we do not need to match the insertion object with all probable matching candidates. We refer to the finding of an object location procedure as GetLocation. GetLocation uses the same terms such as the split dimension and the search key from Search procedure. It returns a pointer to the leaf in which the data object initially will be inserted. It returns NULL if the index tree is empty. When the type of the matching is range matching, we may need to insert the object in different places. It is assumed that GetLocation function will provide all of those details.

GetLocation Procedure
Step 0: If the index structure is empty, return Null.
Step 1: /*Initialization. */
  If this is the first call then do
    Let the split dimension be the first element in the split
      table.
    Let the search key be the first key of the search object.
Step 2: /*It is a leaf node.*/
  If the node under search is leaf then return the node
    address.
Step 3: /* It is an internal node, find the next path to follow.
  */
  If the node under search is an internal node then do;
    If the search came to this point from an equal branch in
      the upper level, let the split dimension be the next
      element in the split table and the search key be the
      field of the search object that corresponds to the split
      dimension.
    If the matching type is
    EXACT: Compare the search key to the values in the node
      until finding the one who is greater than the search key.
      If a value is equal to the search key, apply GetLocation
        Procedure to the subtree in the equal branch of that
        value.
      Otherwise, apply GetLocation Procedure to the left
        subtree of the first value, which is greater than the
        search key. If no value was greater than the search
        key, apply GetLocation Procedure to the last right
        subtree in the node.
    RANGE: Assume P is the set of values in the node which
      are in the range of the search key.
      For any K E P, do;
        Apply Search Procedure to the left, equal and right
          subtrees of K.
    PREFIX: Compare the search key to the values in the
      node until finding the one which is greater than the
      search key.
      If a value is equal to the search key, apply GetLocation
        Procedure to the subtree in the equal branch of that
        value.
      Otherwise, apply GetLocation Procedure to the left
        subtree of the first value, which is greater than the
        search key. If no value was greater than the search
        key, apply GetLocation Procedure to the last right
        subtree in the node. If those subtrees are NULL,
        return the address of the node (internal node) with
        NULL.
End of GetLocation Node Splitting As with any dynamic indexing scheme, node splitting is the base of building the tree structure. Since the index tree of the present invention consists of data objects being indexed on more than one dimension, the node split mechanism depends on the location of the split node and the type of split dimension. Then it is possible to determine the split value. In the following we give the split strategy for each type of splitting, and discuss how the split value is chosen.

If the type of matching for the split dimension is EXACT match (as evidenced in a split table such as that shown in FIG. 13), the median key of the data objects of interest is selected as the split point.

If the type of matching for the split dimension is RANGE match, then the split value is selected as a value that distributes an even number of objects into each subtree. In some cases, this may not be possible, in which case the split value is chosen as a value that distributes a fairly even number of data objects into each subtree, but it is always possible to find a split value to accommodate the newly inserted data object.

If the type of matching for the split dimension is PREFIX match, then we can use the same technique from the dynamic m_way tree disclosed in the parent application and previously discussed herein. The method of splitting in this case can be summarized as follows.

1. If all strings in the node are disjoint, the median is selected as the split point;
2. If there is an enclosure which encloses all other data strings in the node, it is selected for splitting the tree node;
3. In all other cases, the data objects can be a combination of disjoint spaces and strings. In that case, an enclosure or a disjoint object that gives the best splitting result is chosen as the split point. The method should avoid taking objects in the left most or right most subtree as the split point, as this results in the worst splitting scheme (i.e., one node full and another empty).

Insertion Procedure

We are now ready to formally define our object insertion procedure for index tree of the present invention. Insertion here is much more complicated than usual B-tree or the dynamic m_way prefix tree. The insertion procedure always has to remember the type of the split dimension and the split node from which that level tree starts. When the split procedure reaches to the root, it considers it as an independent tree. Therefore, in root splitting, a new split node is created in the upper level and integrated with the rest of the tree. If the type of match in the split node in which the new data object is going to be inserted is a prefix match, the same procedure described in the parent application for inserting objects into a DMP-tree is used.

Insertion Procedure
Step 0: If the index structure is empty then,
    Allocate a new node and make it the root of the index tree.
    Insert the new object into the new node or root of the tree and return
Step 1: /*Initialization. */
    Let the split dimension be the first element in the split table.
    Let the search key be the first key of the search object.
    Let the root be the root of the index tree.
Step 2: /* Find the insertion location.*/
    Call GetLocation function to find the leaf (leaves) into which the new object is going to be inserted.
    Find the last root in finding the location path.
    If the type of match in the insertion node is
    EXACT: Insert the new object into the leaf. Split the leaf node if it overflows and propagate the node splitting if necessary up to the last root.
    RANGE: Insert the new object into the insertion leaf (leaves). Split the overflowed leaf (leaves) and propagate the node splitting if necessary up to the last root.
    PREFIX: If the returned leaf is NULL, then do;
        Allocate a new node and make it the child of the upper node or the last internal node in the search path.
        Insert the new object into the new node.
    If the node under search is an internal node, then the search key is an enclosure of a value in the node;
        Replace the contained value in the node with the new search key.
        Insert the new object into the equal subtree.
        Apply the space division and merge algorithm for the dynamic m_way tree if necessary.
        Reinsert all object elements in the equal subtree of the original value.
    Otherwise, the insertion node is a leaf. Insert the new object into the leaf. Split the leaf node if it overflows and propagate the node splitting if necessary up to the last root.
End of insertion As in the dynamic m_way tree structure, the space division and merge are necessary to keep the data objects in the index tree sorted based on the current dimension. The details of space division and merge algorithms are discussed in the parent application.

2. Second Embodiment of the Present Invention: "Equal Bit"

While the previously discussed embodiment of the multidimensional index tree is superior to other known existing data structures, the first proposed method for multidimensional data indexing suffers from the following shortcomings:

In a real application, we expect a considerable size of keys to be unique. For these keys, since the space is divided by three instead of two, the subtrees pointed to by equal branches will have one element and they will be underutilized. This wastes memory space in the whole tree.

Since the data space is divided by three in each split point, we have to keep three pointers for each value instead of two. This enlarges the internal node width and practically limits the branching factor. The smaller branching factor means larger tree height and slow search time.

As explained previously, '*' is considered the smallest value. When a data space is divided using "*" as the split value, the left branching address will be NULL. This wastes the memory space and also enlarges the internal nodes' width.

The second embodiment of the present invention's solution to these problems is to combine the equal and left subtrees for each split value. Even though it seems like traditional tree structure, this embodiment maintains the basic philosophy of the first embodiment. We previously explained how regular index structures like the B-tree do not have any problem indexing the data set based on one key as long as not too many data objects map to one point such that they cannot be identifiably separated by that key. In the first embodiment all data objects mapping to one point are placed into the equal subtree. When the subtree pointed to by an equal branch overflows, we know all data objects in the subtree have the same key for that split dimension. Then, we have to change the split dimension in order to split the subtree. Therefore, what is really needed is a way to automatically understand that the data objects share the same key for the split dimension of interest and that there needs to be a switch to the next dimension in the split table. This should not take extra time in the search or building index tree process. This can be done by reserving a bit in the address field in the split nodes. In this way, we replace an address, the equal branch address, with one bit and save space. Nevertheless, this deeply affects the index tree building procedure. The search procedure also needs to be revised to accommodate the new tree structure.

Figure 21:
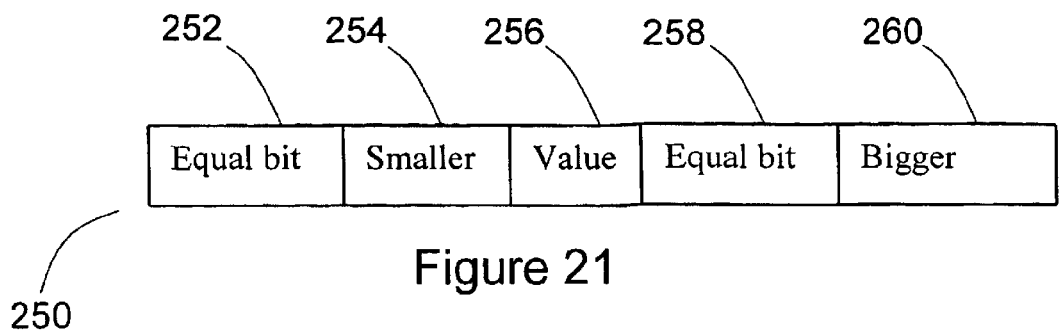
FIG. 21 is an illustration of an example of a split node of the index tree disclosed herein as the second embodiment.

To further illustrate the idea, the structure of a split node of the second embodiment is shown in FIG. 21. Split node 250 comprises a space 254 occupied by a pointer that points to a subtree that is reserved for data objects having a key less than or equal to the split value 256. A first equal bit 252 is allocated for identifying when the pointer in space 254 points to a split node that changes the split dimension. That is, if the equal bit 252 is set, it indicates that all data objects in the subtree pointed to by space 254 have keys equal to the split value 256 and that those data objects have been split based on a dimension other than the dimension of split node 250. Split node 250 also comprises a space 260 occupied by a pointer that points to a subtree that is reserved for data objects having a key greater than the split value 256. Equal bit 258 is reserved for use when another split value is added to split node 250 and space 260 is essentially shared by split value 256 and the new split value. Equal bit 258 will be set if all data objects in the subtree pointed to by space 260 have keys equal to the new split value and those data objects have been split based on a dimension other than the dimension of split node 250 (basically, when space 260 points to another split node). The search process has to always check equal bits before deciding the next step. If this bit is set for any branches in the search path, the split dimension must be switched to the next dimension in the split table.

EXAMPLE 2

In this example, an index tree according to the second embodiment will be built for the rule set of FIG. 30 which is for IP packet classification applications. The same splitting order in FIG. 13 will be used regardless of discrimination ratio. However, it must be noted that the discrimination ratio principle applies to the second embodiment of the invention as well as the first embodiment of the invention. All other assumptions are the same as Example 1. This means source and destination fields are prefixes that are matched against the packet source or destination addresses. In the same way, the protocol field is an exact value for each packet and the source and destination port fields are usually specified as ranges. The rules are indexed first based on the destination address then source address and so on. Each leaf node or subtree can accommodate at most three rules. However, as previously noted the capacity for data objects of the leaf nodes/subtrees can be controlled by a user and set to a desirable threshold.

Figure 22:
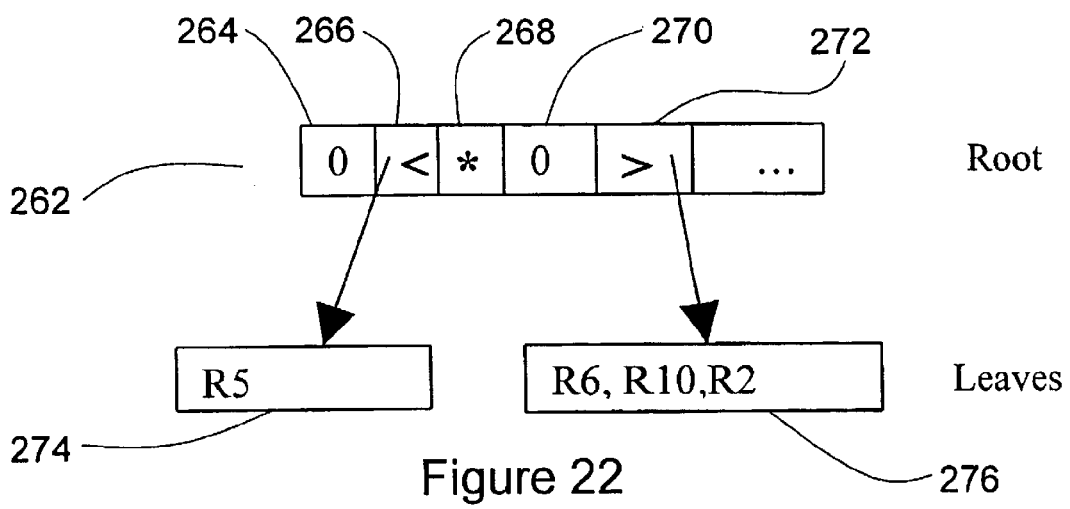
FIG. 22 is an illustration of the index tree of example 2.

Again, like any dynamic tree, the index tree is initially empty and rules are inserted randomly. R6, R10 and R2 are inserted without any problem. Inserting R5 causes overflow and the root is split based on '*'. FIG. 22 illustrates the index structure until this stage. It is worth noting that the equal bit 270 of the right address field is not yet set. We have not set this bit because there was no split in the node pointed to by the space 272 which is associated with equal bit 270. Inserting R7 causes overflow in the rightmost leaf of the tree. Again, 145.134 is the split point. However, splitting the node does not solve our problem. All data elements in the splitting node are smaller or equal to 145.134 and they must be put in the left subtree. Therefore, the node will overflow again. This problem is referred to as an "enclosure overflow problem." We propose two solutions to resolve this problem.

Figure 23:
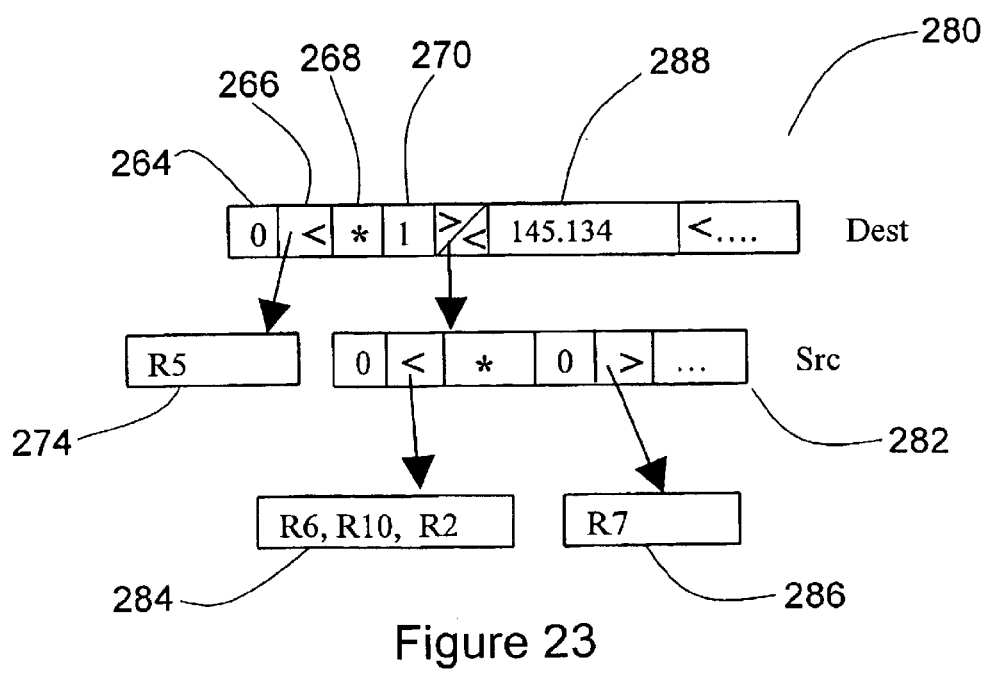
FIG. 23 is a further illustration of the index tree of example 2 as more data objects have been indexed, and the data objects are indexed using the first proposed approach for dealing with an enclosure overflow problem.

Split the overflowed node based on the next split dimension in the split table. In our example, the node is split based on source address. FIG. 23 shows the index tree after a second split using this solution. In FIG. 23, it can be seen that a split node 280 has been supplemented with a new split value 288. The split value 288 is chosen from the keys of the data objects R6, R10, R2, and R7. However, as all of these keys are less than or equal to the split value 288, they are placed into the "less than or equal subtree" associated with split value 288, which will overflow again. To deal with this problem, a new split node 282 has been created to split the data objects on the source address dimension. The data objects R6, R10, R2, and R7 are then placed into subtrees 284 and 286 based on their keys' relation to the split value of the split node 282.

Figure 24:
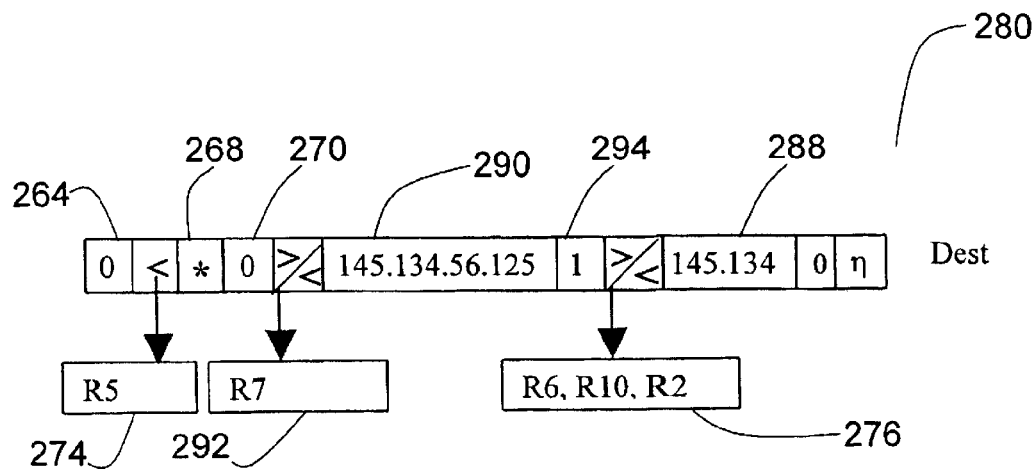
FIG. 24 is a further illustration of the index tree of example 2 as more data objects have been indexed, and the data objects are indexed using the second proposed approach for dealing with an enclosure overflow problem.

The second approach is to perform a "previous split value adjustment" by splitting the overflowed node based on the same split dimension, while eliminating all nodes having the previous split value. FIG. 24 shows the index tree after the second split using this approach. In FIG. 24 it can be seen than split node 280 has been supplemented with two new split values 288 and 290. New split value 290 prevents the enclosure overflow problem from repeatedly occurring by separating the data object having a key smaller than the enclosure from the data objects having keys equal to the enclosure (note how split value 288 is set to be the enclosure value).

The first approach to solving the enclosure overflow problem seems easier. In this method, prefix matching and equality are treated in the same way when the matching element is smaller than the split point. In the second approach, we restrict ourselves to having equal values in order to switch the split dimension in case of overflow. Of course, in both cases we have to set the equal bit in the upper split node. There is another factor that makes the second solution more attractive. The second solution allows more split in the data space based on the current split dimension. We should not forget that the switching point of the split dimension is the root of the new index structure based on the next split dimension. This usually adds up to the general index tree's height. The second approach will be followed in the rest of the example, however, the present invention can be practiced using either approach. It is worth noting that the second approach, dividing the node based on the same split dimension, does not violate any DMP tree properties because 145.134, which is the enclosure of the rest, has already been moved to the upper level.

Figure 25:
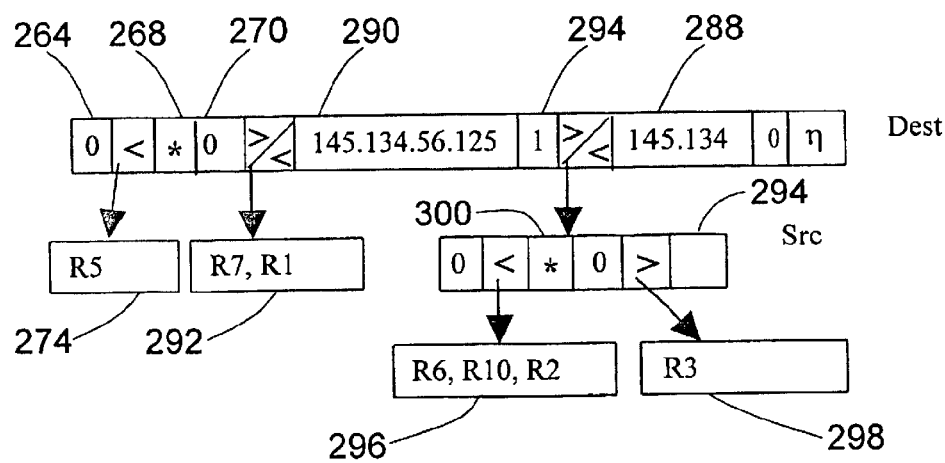
FIG. 25 is a further illustration of the index tree of example 2 as more data objects have been indexed and a split has occurred on a second dimension.

Inserting R1 causes no trouble. R1 is added to the leaf containing R7. Then, we insert R3. R3's destination address is 145.134 and the leaf containing data objects with this value overflows and must therefore be split. The split dimension is changed to the next dimension in the split table, which is the source address. FIG. 25 shows the result of this split. As can be seen in FIG. 25, to accommodate R3, new split node 294 was created to split data objects R6, R10, R2, and R3 on the source address dimension. Those data objects can be placed into subtrees 296 and 298 on the basis of their source address keys' relation to split value 300. The equal bit 294 associated with the pointer pointing down the less than or equal branch associated with split value 288 is set as this pointer points to a split node that splits data objects on another dimension.

Figure 26:
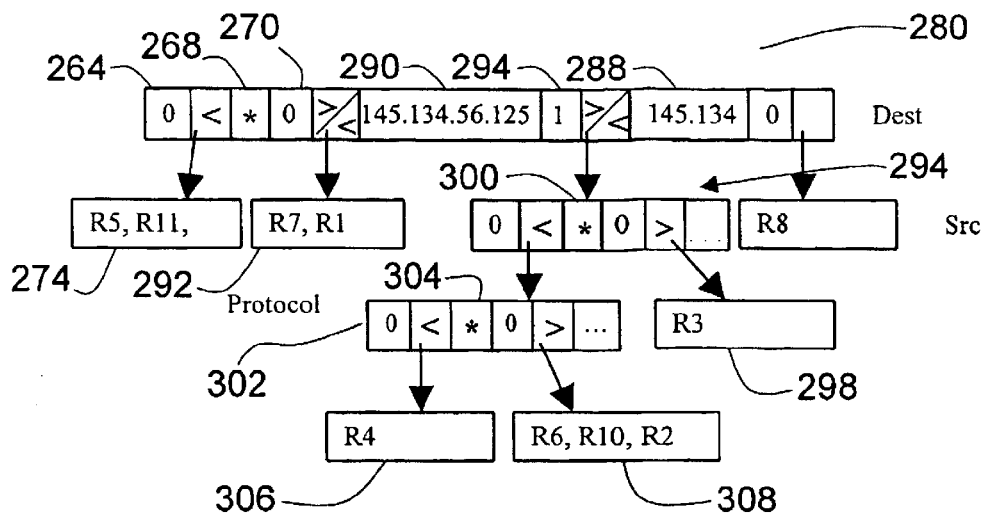
FIG. 26 is an illustration of the index tree of example 2 after all data objects presented for placement have been indexed.

Later, R4 is inserted in the index tree. It must be added in the leaf beside R6, R10 and R2. However, it is full and must be split. We switch the split dimension to protocol and create split node 304 having split value 304 and pointing to subtrees 306 and 308. Inserting the rest of the rules, R11, R9 and R8 causes no new split. The final index tree is shown in FIG. 26. This tree is similar to the index tree in FIG. 19 (they both index the same data) except that the internal nodes use two split branches instead of three. For a large data set, the second method can save a considerable amount of memory in the index tree.

Search Procedure

The search process in the index tree of FIG. 26 is the same as discussed previously in connection with the first embodiment of the present invention except that the equal bits need to be checked in the search path in order to know when the split dimension needs to be switched. Of course, all of the techniques such as discrimination ratio of keys are valid and applicable here. However, the insertion operation is different and we have to deal with some subtle problems as discussed below.

Object Insertion

The first problem to deal with in inserting a new data object is when to set the equal bits. Initially, equal bits are not set. When all the objects in a left subtree (a subtree having space reserved for data objects with keys less than or equal to the subtree's associated split value) have keys equal to the split value in the root of the subtree, we will encounter this problem. Let us assume that the left subtree points to a leaf node that contains objects having keys, which correspond to the split dimension that are equal to the split value. If we want to insert a new object in the leaf, there are two possibilities. If the corresponding key of the new object is not equal to the split value, we can divide the leaf based on the key of the new object. Even though this does not yield a good node split, we do not face a serious problem. Indeed, in this case, we are dealing with the regular dynamic tree object insertion process. However, if the corresponding key of the new object is equal to the split value, the leaf node will overflow, and it is impossible to split the node based on the current split dimension. Our solution to this problem is to set the equal bit in the upper level and split the node based on the next split dimension in the split table. This is the starting point, or root, of a new tree. Therefore, when the equal bit of a branch is set, the split node containing that equal bit is the root of a new tree based on the next split dimension.

Figures 27A, 27B:
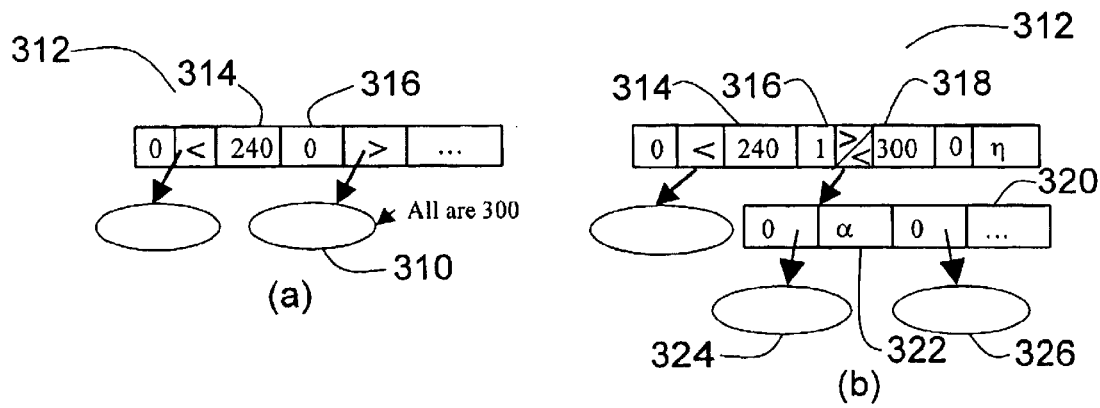
FIGS. 27($a$) and ($b$) are illustrations of how the method of the second embodiment can handle a rightmost subtree overflow problem.

Nevertheless, this is not all of the problems we encounter in inserting a new data object. What if the overflowed leaf containing objects having the same keys is in the rightmost branch of the upper node? When a leaf is in the rightmost branch of an internal node, there is not an explicit split value to compare the keys of the contained objects. For other branches, we do not have such a problem since the corresponding keys, in this situation, will be the same as the split value in the right of the branch in the upper node. We define the rightmost path of a tree in order to deal with this problem. The rightmost path of a tree is a path such that all branches in the path starting from the root to the leaf are the rightmost subtrees in all split nodes in the path. This path is unique for each tree. Looking at FIG. 26, it can be seen that the rightmost subtrees are the subtrees containing R8, R3, and R6, R10, and R2. If the leaf in which the new data object is going to be inserted is in the rightmost path, we insert the corresponding key value in the upper split node, set the equal bit and divide the leaf based on the next split dimension. FIGS. 27(a) and 27(b) illustrate an example of this case.

In FIG. 27(a), if subtree 310 (which is the rightmost subtree for the tree) is overfilled with data objects having a key of 300 on split node 312's dimension, then a "rightmost subtree problem" exists. To accommodate the new data object with a key of "300," a "rightmost subtree node reconfiguration" is performed. Split node 312 is reconfigured with a new split value 318, as shown in FIG. 27(b) that is equal to the keys of the data objects in the rightmost subtree 310. Then, those data objects are split based on the next dimension by newly-created split node 320 (which has split value 322 and indexes the objects into subtrees 324 and 326). Because the data objects with "300" keys have been indexed on a different dimension, the equal bit 316 is set. Please note that the right subtree of the new split value, 300, is empty, which has been identified with $\eta$. The original leaf has also been split based on the new split dimension. However, if the leaf in which the new value is going to be inserted is not in the rightmost path then there is definitely a split point in the upper levels which is greater or equal to the current key values in the leaf. The split value has to be equal to the current key values in the leaf, since each split value represents at least one object in the index tree. If the split value is greater than the corresponding key values, there will be at least an object in the leaf with the corresponding key equal to the split value and this contradicts the first assumption that all objects have the same key. Inserting the same split point does not help. Therefore, the solution in this case is to set the equal bit in the upper level and split the node based on the next split dimension.

The last problem to be considered is inserting an object into a subtree whose equal bit has already been set. This problem is referred to as an "equal bit subtree problem." As previously explained, setting the equal bit of a subtree indicates that all objects in this subtree have the same key as the right split value and that those data objects have been split based on the next split dimension. If the corresponding key of the object is equal to the right split value, we switch the split dimension, and consequently the indexing key of the object, and insert the object into the subtree. In this case we have the regular indexing procedure without no special problems. If the corresponding key of the object was smaller than the right split value, we have to find a way to restrict the subtree for the object having the same corresponding key. We propose the following algorithm to solve this problem.

Equal Subtree Insertion Procedure

Step 1: If the equal bit of the predecessor subtree is not set, replace the left split value of the subtree with the corresponding key of the new object. Then insert the new object into the predecessor subtree and exit.

Step 2: Otherwise, insert the corresponding key of the new object in the node as split point, then, insert the new object into the left subtree of the new split point and exit.

This algorithm tries to avoid creating a new split value in order to have better node utilization. Inserting a new split value creates a new subtree to the left of the split value. This subtree initially does not have any data objects. After inserting the new object we have a leaf node containing only one data object. Step 1 of the Equal Subtree Insertion Procedure attempts to avoid this if possible. It is important to note that replacing the old split value with the new key does not violate any tree property since the corresponding keys of all the objects in the predecessor subtree are smaller than the new value. However, if the equal bit of the predecessor subtree is also set, this means the data elements are mapped into only two points and there are no data objects in between the two points. This leaves us with no options except inserting a new split point, performed by Step 2 of the Equal Subtree Insertion Procedure. It is worth noting that we are trying to index the data object based on the current split dimension as much as possible. We change the split and indexing dimension only when it is absolutely necessary.

Figures 28A, 28B:
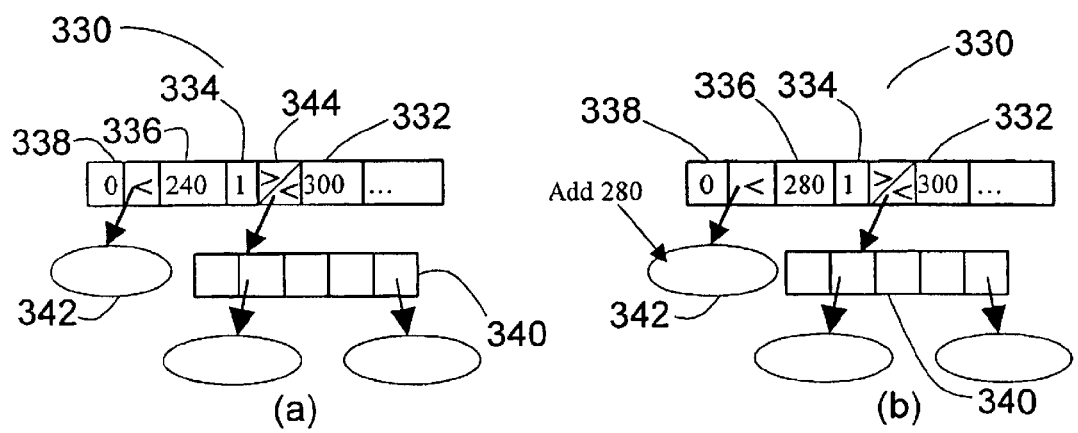
FIGS. 28($a$) and ($b$) are illustrations of how the method of the second embodiment can handle an equal bit subtree overflow problem.

FIGS. 28(a) and 28(b) illustrate the equal bit subtree problem and its solution. FIG. 28(a) depicts an index tree with a split node 330 having two split values in spaces 336 and 332. The equal bit 334 associated with split value 332 has been set, which indicates that space 344 points to another split node which splits data objects on another dimension (split node 340). Split node 340 was created because a subtree pointed to by space 344 overflowed with data objects having a key equal to split value 332. If a data object having a key of "280" is presented for placement in the index tree of FIG. 28(a), the method of the present invention will initially want to place that "280" object into the dataspace pointed to by pointer 344 because "280" is greater than split value 336 (which is "240") but less than split value 332 (which is "300"). However, because the equal bit 344 is set, a data object with a key of "280" does not belong in the dataspace that has been split on another dimension for data objects having keys of "300."

When presented with this problem, the present invention will perform the above-described "equal subtree insertion procedure." A new split value will replace the split value that occupied space 336. This new split value will be the key of the data object that needs to be indexed, but does not fit in an existing subtree. Because the split value 336 is now larger than its previous value, subtree 342 now can accommodate the data object needing to be placed. That data object is then placed into subtree 342. That is, subtree 342 of the tree in FIG. 28(a) is reserved for data objects having keys less than or equal to "240," while subtree 342 of FIG. 28(b) (which is the resultant tree after performing the equal bit subtree procedure) is reserved for data objects having keys less than or equal to "280."

Thus, the insertion algorithm for data objects into the index tree of the second embodiment of the present invention can be described as shown below:

Insertion Procedure
Step 0: If the index structure is empty, then,
  Allocate a new node and make it the root of the index tree.
  Insert the new object into the new node or root of the tree and return
Step 1: /*Initialization. */
  If this is the first call of the Insertion procedure
    Let the split dimension be the first element in the split table.
    Let the search key be the first key of the new object.
    Let the root be the root of the index tree.
Step 2: /*We are in the leaf.*/
  If this is a leaf node
    If the type of the matching of the corresponding split dimension is PREFIX and the leaf is NULL, then do;
      Allocate a new node and make it the child of the upper node or the last internal node in the search path.
      Insert the new object into the new node and return.
    Insert the new object into the leaf.
    In case the leaf node overflows;
      If all objects in the leaf have the same key and the leaf is in the rightmost path
        Insert the key in the upper internal node, set the equal bit in the upper node and split the leaf based on the next split dimension. Return.
      If all objects in the leaf have the same key
        Set the equal bit in the upper internal node and split the leaf based on the next split dimension. Return.
      Split the leaf and propagate the node splitting if necessary up to the last root. Return.
Step 3: /* It is an internal node. */
  If this is an internal node then
    If the search came to this point from an equal branch in the upper level,
      Change the split dimension to the next element in the split table and the search key of the object to the corresponding key.
      Call the Insertion procedure to insert the object into the subtree rooted in the node and return.
    If the matching type is
    EXACT: Compare the search key to the split values in the node and assume P is the split value which is greater than or equal to the search key.
      If P is equal to the search key and the left equal bit of P is set,
        Apply the Equal Subtree Insertion Procedure and return.
      Otherwise, apply the Insertion Procedure to the left subtree of P with the new object and return.
    RANGE: Assume P is the set of values in the node which are in the range of the search key.
      For any K∈P, do;
        If the left equal bit of P is set,
          Change the split dimension to the next element in the split table and the search key of the object to the corresponding key.
          Call the Insertion procedure to insert the object into the subtree rooted in P.
        Otherwise, Call the Insertion procedure to insert the object into the subtree rooted in P.
      Return.
    PREFIX: if the search key is an enclosure of a value, P, in the node then,\
      Apply the Insertion Procedure to insert object into the left subtree of P.
      Replace P with the search key.
      Move data element around the key to sort the data elements in the subtree.
      Return.
    Compare the search key to the split values in the node and assume P is the split value which is greater than or equal to the search key.
      If P is equal to the search key and the left equal bit of P is set,
        Apply the Equal Subtree Insertion Procedure and return.
      Otherwise, apply the Insertion Procedure to the left subtree of P with the new object and return.
End of insertion It must be noted that the method of the present invention can be easily implemented on a computer using software that is programmed to perform the disclosed algorithms and methods.

As previously discussed, FIGS. 19 and 26 disclose two examples of the multi-dimensional index trees that can be produced in accordance with the method of the present invention. In the first embodiment, he multi-dimensional index tree indexes data objects on multiple dimensions by recursively dividing dataspace within each dimension into three subspaces and if too many data objects map into a single space, then the split dimension is changed, a new level is created for the new split dimension, and the data objects needing insertion into dataspace on this level are split using the new dimension. The index tree of FIG. 19 depicts a first level occupied by split node 130 and subtrees 132, 134, 158, and 154. This level indexes data objects using a first split dimension, which in this example is destination address. Split node 130 has two split values, "*" and "145.134." The tree of FIG. 19 has a second level occupied by split node 160, subtree 172, and an empty subtree branched from the nil space (not shown). This level splits data objects using their source address key. The lowest level of the index tree of FIG. 19 is occupied by split node 176 and subtrees 178, 180, and an empty subtree branched from the nil space (not shown). This level indexes data objects using their protocol keys.

The split node used in the FIG. 19 tree is that depicted in FIG. 14. The index tree produced by the technique of the first embodiment will have one split node in the highest level. This split node may have multiple split values depending upon the amount of data splits that occur within the split dimension of the highest level. As data objects overflow the subtrees in the highest level, and those data objects can be identifiably separated using the highest level split dimension, a new split value will be added to the split node that was previously created for that level. Thus, the maximum number of split values in the split node of the highest level will depend upon the number of same dimension splits that occur within the level. Also, the highest level (or any intermediate level that is not the bottom level) will have at least two subtrees —the subtrees associated with data objects less than or greater than a particular split value. If there is a lower level, an equal subtree will have been replaced with a lower level split node that splits data objects on a different dimension. Therefore, the bottom level—which by definition will not point to another lower level—must have at least three subtrees—the lesser, equal, and greater subtrees, because the equal subtree will not have an overflow.

FIG. 26 discloses the index tree produced by the second embodiment of the present invention. This index tree has three levels—an upper level associated with the destination address dimension, a second level associated with the source address dimension, and a third level associated with the protocol dimension. Each of these levels has various subtrees therewithin. The split node of this embodiment is that shown in FIG. 21. Because the second method merges the equal subtree into the lesser subtree and uses equal bits to track the contents of the subtrees, the minimum number of subtrees per level is changed from that of the first embodiment. The index tree of the second embodiment has at least one subtree in any level that is not a bottom level, and at least two subtrees in the bottom level.

A computer can be configured to build the index tree of the present invention using software that performs the disclosed methods.

Figure 29:
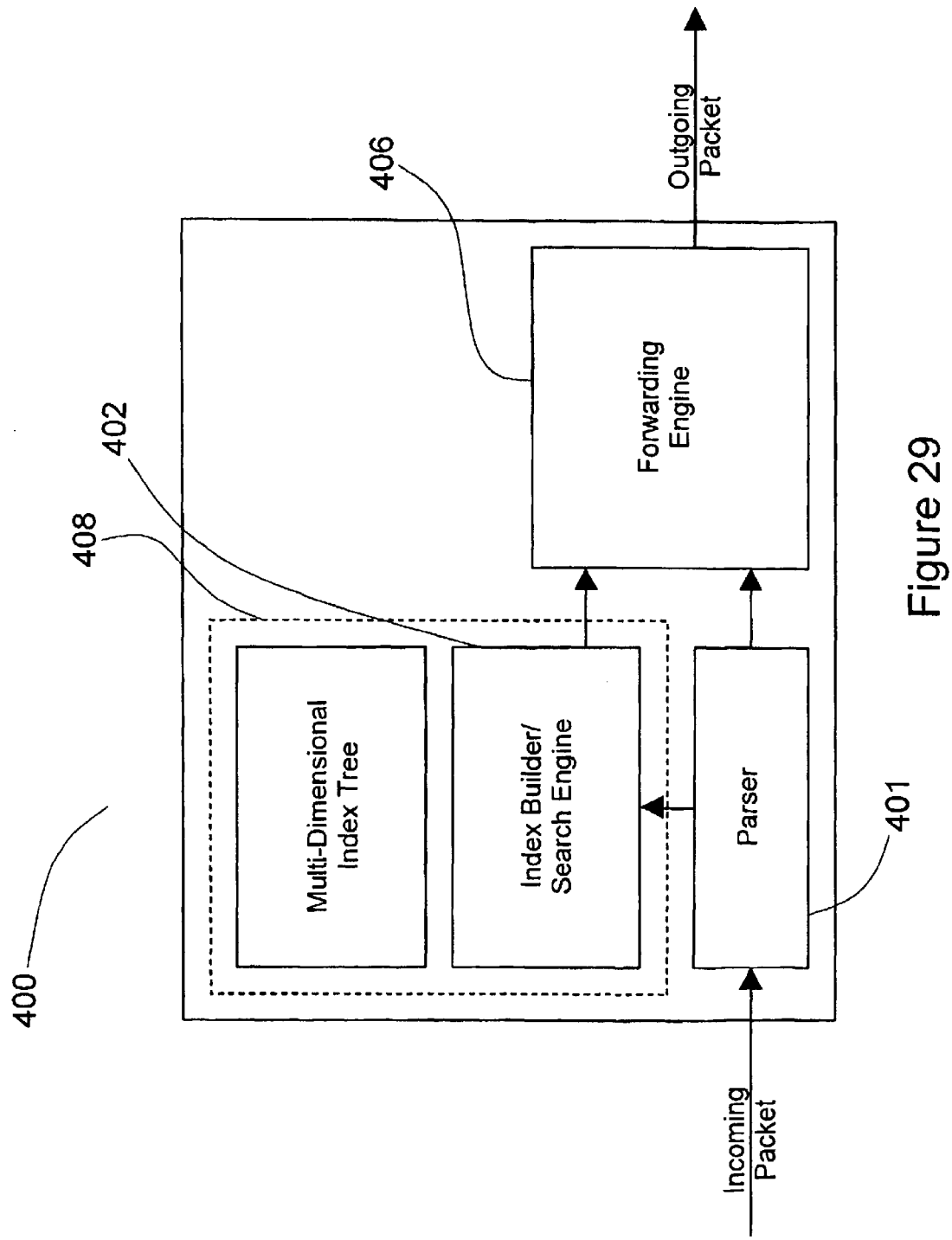
FIG. 29 illustrates an example of a router that can be built in accordance with the present invention.

The index tree of the present invention is aptly suited for use in routers. A typical router is shown in FIG. 29. The router 400 is comprised of a parser 401 that receives incoming packets and parses the packets into their various keys. The index builder 402 builds the multi-dimensional index tree of the present invention by performing the methods disclosed herein. The tree 404 can be used to index IP packet classification rules such as those found in FIG. 30.

The index builder is also capable of functioning as a search engine to search the tree 404 for a data object indexed in the tree that matches an incoming packet. Such a search can be a search for an exact match, a prefix match, or a range match. Together, the index tree and index builder/search engine can function as a packet classifier 408. Upon performing a search of the tree 404 and obtaining a matching rule for the incoming packet, the index builder/search engine can pass the rule on to the forwarding engine 406. The forwarding engine can then switch the packet in accordance with the rule. For example, the forwarding engine can provide switching in layers 3 and 4 of the TCP/IP protocol and can provide differentiated service, such as bandwidth allocation, on the basis of a matching rule.

Therefore, while the parent and present inventions have been described by reference to specific embodiments, it should be understood and apparent to those skilled in the art that modifications and variations of the inventions may be constructed without departing from the scope of the invention. It is therefore intended that the invention be limited only by the scope of the claims appended hereto, and their legal equivalents.

What is claimed is:

1. A method of building a multi-dimensional index tree for use in searching for data objects; said method comprising:
   a) placing a data object into an appropriate leaf node, said leaf node having a predetermined capacity for data objects, each of said data objects having a plurality of keys, each of said keys being associated with a split dimension;
   b) dividing said leaf node into N subtrees when said leaf node is filled with a number of data objects exceeding said capacity, each of said subtrees having a predetermined capacity for data objects, wherein N is at least two;
   c) indexing said data objects in said excessively-filled leaf node into an appropriate subtree on the basis of a first split dimension if said data objects in said excessively-filled leaf node can be identifiably separated on the basis of said first split dimension or on the basis of a different split dimension if said data objects in said excessively-filled leaf node cannot be identifiably separated on the basis of said first split dimension; and
   d) repeating steps a) through c) until all data objects presented for placement have been indexed, wherein each of said subtrees is treated as a leaf node on each successive pass.

2. The method of claim 1 wherein step c) further comprises:
   i) if said data objects in said excessively-filled leaf node can be identifiably separated on the basis of said keys in said data objects associated with a first split dimension, then:
      A) splitting said data objects in said excessively-filled leaf node on the basis of a key within each of said data objects associated with said first split dimension;
      B) if said split of data objects is an initial split, then creating a split node associated with said first split dimension pointing to each of said subtrees;
      C) if said split of data objects is not an initial split, then supplementing said split node created upon said initial split with pointers pointing to each of said subtrees; and
      D) placing each of said data objects in said excessively-filled leaf node into an appropriate subtree;
   ii) if said data objects in said excessively-filled leaf node cannot be identifiably separated on the basis of a first split dimension, then:
      A) changing said first split dimension to a new split dimension under which said data objects in said excessively-filled leaf node can be identifiably separated;
      B) splitting said data objects in said excessively-filled leaf node on the basis of a key within each of said data objects associated with said new split dimension;

C) creating a split node associated with said new split dimension pointing to each of said subtrees; and D) placing each of said data objects in said excessively-filled leaf node into an appropriate subtree; and wherein on each successive pass, if a split node is pointing to a subtree, said first split dimension for said subtree is said split dimension associated with said split node pointing to said subtree.

3. The method of claim 2 wherein N is three, said three subtrees being a first subtree, a second subtree, and a third subtree.

4. The method of claim 3 wherein steps c)i)B) and c)ii)C) further comprise determining a split value for said split node, said split node having a space occupied by a pointer pointing to said first subtree, a space occupied by said split value, a space occupied by a pointer pointing to said second subtree, and a space occupied by a pointer pointing to said third subtree.

5. The method of claim 4 wherein step c)i)C) further comprises determining a supplemental split value for said split node, said split node further having a space occupied by a pointer pointing to said first subtree, a space occupied by said supplemental split value, a space occupied by a pointer pointing to said second subtree, and a space occupied by a pointer pointing to said third subtree.

6. The method of claim 5 wherein steps c)i)D) and c)ii)D) further comprise placing each data object in said excessively-filled leaf node having a key associated with said split dimension under which said data objects were split less than said split value into said first subtree, placing each data object in said excessively-filled leaf node having a key associated with said split dimension under which said data objects were split equal to said split value into said second subtree, and placing each data object in said excessively-filled leaf node having a key associated with said split dimension under which said data objects were split greater than said split value into said third subtree.

7. The method of claim 6 further comprising determining a match type by checking a split table, said match type determination depending upon said split dimension under which said data objects were split, and wherein said split value determinations depend upon said determined match type.

8. The method of claim 7 wherein said determined match type is selected from one of a group consisting of exact matching, range matching, and prefix matching.

9. The method of claim 2 further comprising choosing a first split dimension for an initial split of data objects on the basis of discrimination ratios assigned to each split dimension associated with said plurality of keys in said data objects, wherein said first split dimension is that split dimension with the largest discrimination ratio.

10. The method of claim 9 further comprising choosing said new split dimension on the basis of said discrimination ratios, wherein said new split dimension is that split dimension with the next-largest discrimination ratio under which said data objects needing to be split can be identifiably separated.

11. The method of claim 2 wherein N is two, said two subtrees being a first subtree and a second subtree.

12. The method of claim 11 wherein steps c)i)B) and c)ii)C) further comprise determining a split value for said split node, said split node having a space occupied by a first equal bit, a space occupied by a pointer pointing to said first subtree, a space occupied by said split value, a space occupied by a second equal bit, and a space occupied by a pointer pointing to said third subtree.

13. The method of claim 12 wherein step c)i)C) further comprises determining a supplemental split value for said split node, said split node further having a space occupied by a first equal bit, a space occupied by a pointer pointing to said first subtree, a space occupied by said supplemental split value, a space occupied by a second supplemental equal bit, and a space occupied by a pointer pointing to said second subtree.

14. The method of claim 13 further comprising determining a match type by checking a split table, said match type determination depending upon said split dimension under which said data objects were split, and wherein said split value determination depends upon said determined match type.

15. The method of claim 13 wherein steps c)i)D) and c)ii)D) further comprise placing each data object in said excessively-filled leaf node having a key associated with said split dimension under which said data objects were split less than or equal to said split value into said first subtree, and placing each data object in said excessively-filled leaf node having a key associated with said split dimension under which said data objects were split greater than said split value into said second subtree.

16. The method of claim 15 wherein if data objects within an excessively-filled first subtree are split under step c)ii), said method further comprising the step of setting said first equal bit associated with said excessively-filled first subtree in said split node pointing to said excessively-filled first subtree.

17. The method of claim 15 wherein if data objects within an excessively-filled second subtree are split under step c)ii), said method further comprising the step of setting said second equal bit associated with said excessively-filled second subtree in said split node pointing to said excessively-filled second subtree.

18. The method of claim 15 wherein if a rightmost subtree problem exists, then performing a rightmost subtree node reconfiguration.

19. The method of claim 15 wherein if an enclosure overflow problem exists, then performing a previous split value adjustment.

20. The method of claim 15 wherein if an equal bit subtree problem exists, then performing an equal subtree insertion procedure.

21. The method of claim 1 wherein said predetermined capacity for data objects is ten data objects.

22. The method of claim 1 wherein said predetermined capacity for data objects is sixteen data objects.

23. The method of claim 1 further comprising the step of searching said index tree for a data object matching a query object.

24. The method of claim 23 wherein said searching step includes searching said index tree for a data object that is an exact match of said query object.

25. The method of claim 23 wherein said searching step includes searching said index tree for all data objects that are a range match of said query object.

26. The method of claim 23 wherein said searching step includes searching said index tree for all data objects that are a prefix match of said query object.

27. The method of claim 1 wherein said data objects are IP packet classification rules.

28. The method of claim 27 wherein said IP packet classification rules have keys associated with a plurality of split dimensions, said split dimensions comprising a destination address, a source address, a destination port, a source port, and a protocol.

29. A computer configured to build a multi-dimensional index tree for use in searching data objects; said computer comprising:

a) dataspace comprising a plurality of leaf nodes, said leaf nodes capable of being recursively divided into a plurality of subtrees;

b) means for placing a data object into an appropriate leaf node, said leaf node having a predetermined capacity for data objects, each of said data objects having a plurality of keys, each of said keys being associated with a split dimension;

c) means for dividing said leaf node into N subtrees when said leaf node is filled with a number of data objects exceeding said capacity, each of said subtrees having a predetermined capacity for data objects, wherein N is at least two;

d) means for indexing said data objects in said excessively-filled leaf node into an appropriate subtree on the basis of a first split dimension if said data objects in said excessively-filled leaf node can be identifiably separated on the basis of said first split dimension or on the basis of a different split dimension if said data objects in said excessively-filled leaf node cannot be identifiably separated on the basis of said first split dimension; and e) means for repeating said functions of means b), c), and d) until all data objects presented for indexing have been placed, wherein each of said subtrees is treated as a leaf node on each successive pass.

30. The computer of claim 29 wherein said means d) further comprises:

i) means for splitting said data objects in said excessively-filled leaf node on the basis of a key within each of said data objects associated with said first split dimension if said data objects in said excessively-filled leaf node can be identifiably separated on the basis of said keys in said data objects associated with a first split dimension;

ii) means for creating a split node associated with said first split dimension pointing to each of said subtrees if said data objects in said excessively-filled leaf node can be identifiably separated on the basis of said keys in said data objects associated with a first split dimension and said split of data objects is an initial split;

iii) means for supplementing said split node pointing created upon said initial split with pointers pointing to each of said subtrees if said data objects in said excessively-filled leaf node can be identifiably separated on the basis of said keys in said data objects associated with a first split dimension and if said split of data objects is not an initial split;

iv) means for changing said first split dimension to a new split dimension under which said data objects in said excessively-filled leaf node can be identifiably separated if said data objects in said excessively-filled leaf node cannot be identifiably separated on the basis of a first split dimension;

v) means for creating a split node associated with said new split dimension pointing to each of said subtrees, if said data objects in said excessively-filled leaf node cannot be identifiably separated on the basis of a first split dimension;

vi) means for splitting said data objects in said excessively-filled leaf node on the basis of a key within each of said data objects associated with said new split dimension, if said data objects in said excessively-filled leaf node cannot be identifiably separated on the basis of a first split dimension;

vii) means for placing each of said data objects in said excessively-filled leaf node into an appropriate subtree; and wherein on each successive pass, if a split node is pointing to a subtree, said first split dimension for said subtree is said split dimension associated with said split node pointing to said subtree.

31. The computer of claim 30 wherein N is three, said three subtrees being a first subtree, a second subtree, and a third subtree.

32. The computer of claim 31 wherein means d)ii) and d)v) further comprise means for determining a split value for said split node, said split node having a space occupied by a pointer pointing to said first subtree, a space occupied by said split value, a space occupied by a pointer pointing to said second subtree, and a space occupied by a pointer pointing to said third subtree.

33. The computer of claim 32 wherein means d)iii) further comprises means for determining a supplemental split value for said split node, said split node further having a space occupied by a pointer pointing to said first subtree, a space occupied by said supplemental split value, a space occupied by a pointer pointing to said second subtree, and a space occupied by a pointer pointing to said third subtree.

34. The computer of claim 33 wherein means d)vii) further comprises means for placing each data object in said excessively-filled leaf node having a key associated with said split dimension under which said data objects were split less than said split value into said first subtree, means for placing each data object in said excessively-filled leaf node having a key associated with said split dimension under which said data objects were split equal to said split value into said second subtree, and means for placing each data object in said excessively-filled leaf node having a key associated with said split dimension under which said data objects were split greater than said split value into said third subtree.

35. The computer of claim 33 further comprising a split table and wherein means d)ii), d)iii), and d)v) further comprise means for determining a match type by checking said split table, said match type determination depending upon said split dimension under which said data objects were split, and wherein said split value determination depends upon said determined match type.

36. The computer of claim 35 wherein said determined match type is selected from on of a group consisting of exact matching, range matching, and prefix matching.

37. The computer of claim 30 further comprising means for choosing a first split dimension for an initial split of data objects on the basis of a discrimination ratio assigned to each split dimension associated with said plurality of keys in said data objects, wherein said first split dimension is that split dimension with the largest discrimination ratio.

38. The computer of claim 37 further comprising means for choosing said new split dimension on the basis of said discrimination ratios, wherein said new split dimension is that split dimension with the next-largest discrimination ratio under which said data objects needing to be split can be identifiably separated.

39. The computer of claim 30 wherein N is two, said two subtrees being a first subtree and a second subtree.

40. The computer of claim 39 wherein means d)i) and d)iv) further comprise means for determining a split value for said split node, said split node having a space occupied by a first equal bit, a space occupied by a pointer pointing to said first subtree, a space occupied by said split value, a space occupied by a second equal bit, and a space occupied by a pointer pointing to said third subtree.

41. The computer of claim 40 wherein means d)iii) further comprises means for determining a supplemental split value for said split node, said split node further having a space occupied by a supplemental first equal bit, a space occupied by a pointer pointing to said first subtree, a space occupied by said supplemental split value, a space occupied by a supplemental second equal but, and a space occupied by a pointer pointing to said second subtree.

42. The computer of claim 41 further comprising a split table and wherein said means d)i, d)iii), and d)v) further comprise means determining a match type by checking said split table, said match type determination depending upon said split dimension under which said data objects were split, and wherein said split value determination depends upon said determined match type.

43. The computer of claim 41 wherein means d)vii) further comprises means for placing each data object in said excessively-filled leaf node having a key associated with said split dimension under which said data objects were split less than or equal to said split value into said first subtree, and means for placing each data object in said excessively-filled leaf node having a key associated with said split dimension under which said data objects were split greater than said split value into said second subtree.

44. The computer of claim 43 wherein if data objects within an excessively-filled first subtree are split by means d)vi), said computer further comprising means for setting said first equal bit associated with said excessively-filled first subtree in said split node pointing to said excessively-filled first subtree.

45. The computer of claim 43 wherein if data objects within an excessively-filled second subtree are split by means d)vi), said computer further comprising means for setting said second equal bit associated with said excessively-filled second subtree in said split node pointing to said excessively-filled second subtree.

46. The computer of claim 43 wherein means d) further comprises means for performing a rightmost subtree node reconfiguration, said reconfiguration occurring if a rightmost subtree problem exist.

47. The computer of claim 43 wherein means d) further comprises means for performing a previous split value adjustment, said adjustment occurring if an enclosure overflow problem exists.

48. The computer of claim 43 wherein means d) further comprises means for performing an equal subtree insertion procedure, said procedure occurring if an equal bit subtree problem exists.

49. The computer of claim 29 wherein said predetermined capacity for data objects is ten data objects.

50. The computer of claim 29 wherein said predetermined capacity for data objects is sixteen data objects.

51. The computer of claim 29 further comprising means for searching said index tree for a data object matching a query object.

52. The computer of claim 51 wherein said searching means includes means for searching said index tree for a data object that is an exact match of said query object.

53. The computer of claim 51 wherein said searching means includes means for searching said index tree for all data objects that are a range match of said query object.

54. The computer of claim 51 wherein said searching means includes means for searching said index tree for all data objects that are a prefix match of said query object.

55. The method of claim 29 wherein said data objects are IP packet classification rules.

56. The method of claim 55 wherein said IP packet classification rules have keys associated with a plurality of split dimensions, said split dimensions comprising a destination address, a source address, a destination port, a source port, and a protocol.

57. A database indexing a plurality of multi-dimensional data objects on a plurality of a dimensions, said database comprising:
   a) a upper level comprising:
      i) an upper level split node having at least one split value, said upper level split node having pointers pointing to each upper level subtree, and said upper level split node having at least one pointer pointing to a split node in a lower level;
      ii) at least N upper level subtrees, each of said upper level subtrees being associated with an upper level split value;
      iii) a plurality of indexed upper level data objects, each of said upper level data objects having a plurality of keys, each of said keys being associated with a different split dimension; and
   wherein each of said upper level data objects are indexed into said upper level subtrees on the basis of a key within said upper level data objects, said key being associated with a split dimension for said upper level; and
   b) a lower level comprising:
      i) at least one lower level split node having at least one split value, said lower level split node having pointers pointing to each lower level subtree;
      ii) at least M lower level subtrees, each of said lower level subtrees being associated with a lower level split dimension;
      iii) a plurality of indexed lower level data objects, each of said lower level data objects having a plurality of keys, each of said keys being associated with a different split dimension; and
   wherein each of said lower level data objects are indexed into said lower level subtrees on the basis of a key within said lower level data objects, said key being associated with a split dimension for said lower level, said lower level split dimension being different than said upper level split dimension.

58. The database of claim 57 wherein N is two.

59. The database of claim 58 wherein upper level data objects having a key associated with said upper level split dimension less than a split value in said upper level split node are indexed into an upper level subtree reserved for upper level data objects having keys less than said upper level split value.

60. The database of claim 58 wherein upper level data objects having a key associated with said upper level split dimension greater than a split value in said upper level split node are indexed into an upper level subtree reserved for upper level data objects having keys greater than said upper level split value.

61. The database of claim 58 wherein upper level data objects having a key associated with said upper level split dimension equal to a split value in said upper level split node are indexed into an upper level subtree reserved for upper level data objects having keys equal to said upper level split value.

62. The database of claim 57 wherein M is three.

63. The database of claim 62 wherein lower level data objects having a key associated with said lower level split dimension less than a split value in said lower level split node are indexed into a lower level subtree reserved for lower level data objects having keys less than said lower level split value.

64. The database of claim 62 wherein lower level data objects having a key associated with said lower level split dimension greater than a split value in said lower level split node are indexed into a lower level subtree reserved for lower level data objects having keys greater than said lower level split value.

65. The database of claim 62 wherein lower level data objects having a key associated with said lower level split dimension equal to a split value in said lower level split node are indexed into a lower level subtree reserved for lower level data objects having keys equal to said lower level split value.

66. The database of claim 57 wherein N is one and said upper level split node further comprises at least one space occupied by a first equal bit and at least one space occupied by a second equal bit.

67. The database of claim 66 wherein upper level data objects having a key associated with said upper level split dimension less than or equal to a split value in said upper level split node are indexed into an upper level subtree reserved for upper level data objects having keys less than or equal to said upper level split value.

68. The database of claim 66 wherein upper level data objects having a key associated with said upper level split dimension greater than a split value in said upper level split node are indexed into an upper level subtree reserved for upper level data objects having keys greater than said upper level split value.

69. The database of claim 66 wherein any equal bit having an association with a pointer pointing to a lower level split node is set.

70. The database of claim 57 wherein M is two and said lower level split node further comprises at least one space occupied by a first equal bit and at least one space occupied by a second equal bit.

71. The database of claim 70 wherein lower level data objects having a key associated with said lower level split dimension less than or equal to a split value in said lower level split node are indexed into a lower level subtree reserved for lower level data objects having keys less than or equal to said lower level split value.

72. The database of claim 70 wherein lower level data objects having a key associated with said lower level split dimension greater than a split value in said lower level split node are indexed into a lower level subtree reserved for lower level data objects having keys greater than said lower level split value.

73. The database of claim 57 wherein each of said upper level and lower level subtrees have a predetermined capacity for data objects.

74. A router for forwarding data packets, said router comprising:
   a) a searchable multi-dimensional index tree, said multi-dimensional index tree comprising
      i) a upper level comprising:
         A) an upper level split node having at least one split value, said upper level split node having pointers pointing to each upper level subtree, and said upper level split node having at least one pointer pointing to a split node in a lower level;
         B) at least N upper level subtrees, each of said upper level subtrees being associated with an upper level split value;
         C) a plurality of indexed upper level data objects, each of said upper level data objects having a plurality of keys, each of said keys being associated with a different split dimension; and
      wherein each of said upper level data objects are indexed into said upper level subtrees on the basis of a key within said upper level data objects, said key being associated with a split dimension for said upper level; and
      ii) a lower level comprising:
         A) at least one lower level split node having at least one split value, said lower level split node having pointers pointing to each lower level subtree;
         B) at least M lower level subtrees, each of said lower level subtrees being associated with a lower level split dimension;
         C) a plurality of indexed lower level data objects, each of said lower level data objects having a plurality of keys, each of said keys being associated with a different split dimension; and
      wherein each of said lower level data objects are indexed into said lower level subtrees on the basis of a key within said lower level data objects, said key being associated with a split dimension for said lower level, said lower level split dimension being different than said upper level split dimension; and
   b) a search engine for searching said index tree to find an indexed data object matching a received data packet.

75. The router of claim 74 wherein N is two and M is three, and wherein upper level data objects having a key associated with said upper level split dimension less than a split value in said upper level split node are indexed into an upper level subtree reserved for upper level data objects having keys less than said upper level split value, and wherein upper level data objects having a key associated with said upper level split dimension greater than a split value in said upper level split node are indexed into an upper level subtree reserved for upper level data objects having keys greater than said upper level split value, and wherein upper level data objects having a key associated with said upper level split dimension equal to a split value in said upper level split node are indexed into an upper level subtree reserved for upper level data objects having keys equal to said upper level split value, and wherein lower level data objects having a key associated with said lower level split dimension less than a split value in said lower level split node are indexed into a lower level subtree reserved for lower level data objects having keys less than said lower level split value, and wherein lower level data objects having a key associated with said lower level split dimension greater than a split value in said lower level split node are indexed into a lower level subtree reserved for lower level data objects having keys greater than said lower level split value, and wherein lower level data objects having a key associated with said lower level split dimension equal to a split value in said lower level split node are indexed into a lower level subtree reserved for lower level data objects having keys equal to said lower level split value.

76. The router of claim 74 wherein N is one, M is two, and said each of said upper level and lower level split nodes further comprise at least one space occupied by a first equal bit and at least one space occupied by a second equal bit, and wherein upper level data objects having a key associated with said upper level split dimension less than or equal to a split value in said upper level split node are indexed into an upper level subtree reserved for upper level data objects having keys less than or equal to said upper level split value, and wherein upper level data objects having a key associated with said upper level split dimension greater than a split value in said upper level split node are indexed into an upper level subtree reserved for upper level data objects having keys greater than said upper level split value, and wherein any equal bit having an association with a pointer pointing to a lower level split node is set, and wherein lower level data objects having a key associated with said lower level split dimension less than or equal to a split value in said lower level split node are indexed into a lower level subtree reserved for lower level data objects having keys less than or equal to said lower level split value, and wherein lower level data objects having a key associated with said lower level split dimension greater than a split value in said lower level split node are indexed into a lower level subtree reserved for lower level data objects having keys greater than said lower level split value.

77. The router of claim 74 further comprising an index builder for building said multi-dimensional index tree, said index builder comprising:

i) means for placing a data object into an appropriate leaf node, said leaf node having a predetermined capacity for data objects, each of said data objects having a plurality of keys, each of said keys being associated with a split dimension;

ii) means for dividing said leaf node into N subtrees when said leaf node is filled with a number of data objects exceeding said capacity, each of said subtrees having a predetermined capacity for data objects, wherein N is at least two;

iii) means for indexing said data objects in said excessively-filled leaf node into an appropriate subtree on the basis of a first split dimension if said data objects in said excessively-filled leaf node can be identifiably separated on the basis of said first split dimension or on the basis of a different split dimension if said data objects in said excessively-filled leaf node cannot be identifiably separated on the basis of said first split dimension; and iv) means for repeating said functions of means i), ii), and iii) until all data objects presented for indexing have been placed, wherein each of said subtrees is treated as a leaf node on each successive pass.

78. The router of claim 74 wherein said data objects are IP packet classification rules.

79. The router of claim 78 wherein said IP packet classification rules have keys associated with a plurality of split dimensions, said split dimensions comprising a destination address, a source address, a destination port, a source port, and a protocol.

80. The router of claim 78 further comprising a forwarding engine, said forwarding engine switching data packets in layer 3 of the TCP/IP protocol.

81. The router of claim 78 further comprising a forwarding engine, said forwarding engine switching data packets in layer 4 of the TCP/IP protocol.

82. The router of claim 78 further comprising a forwarding engine, said forwarding engine providing differentiated service on the basis of a matching IP packet classification rule.

* * * * *